Figure 21:
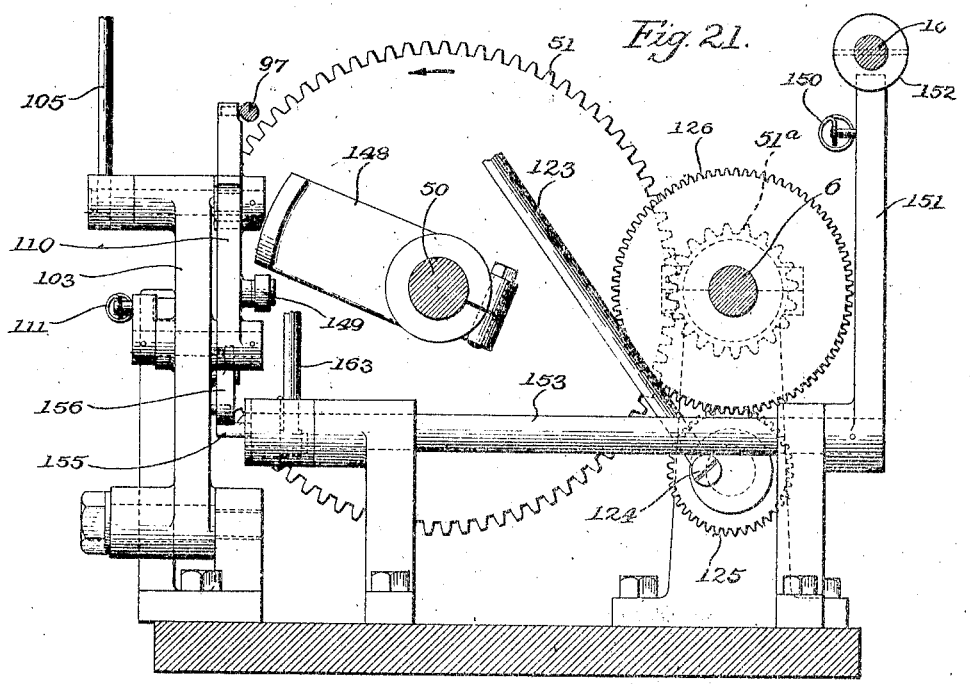

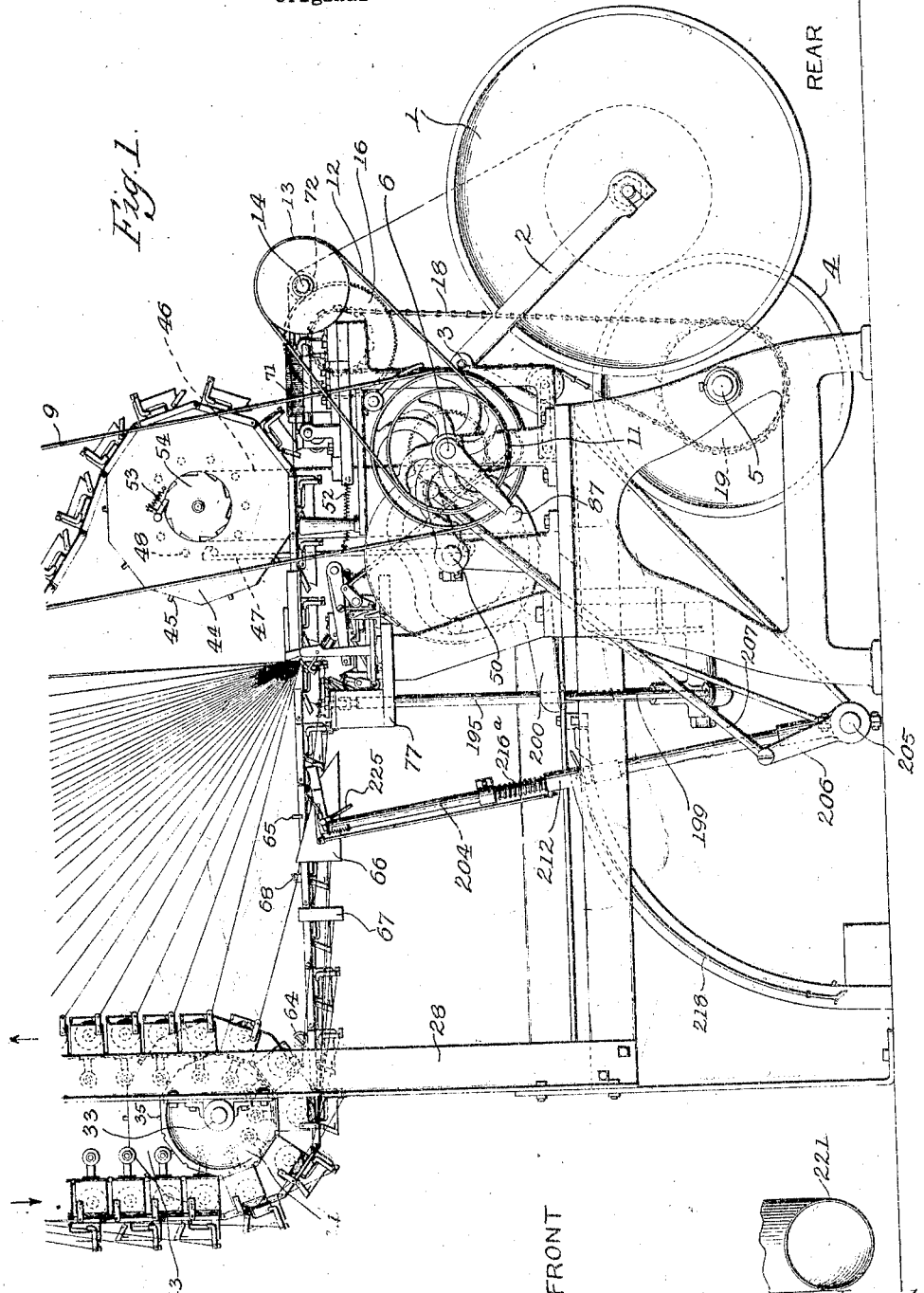

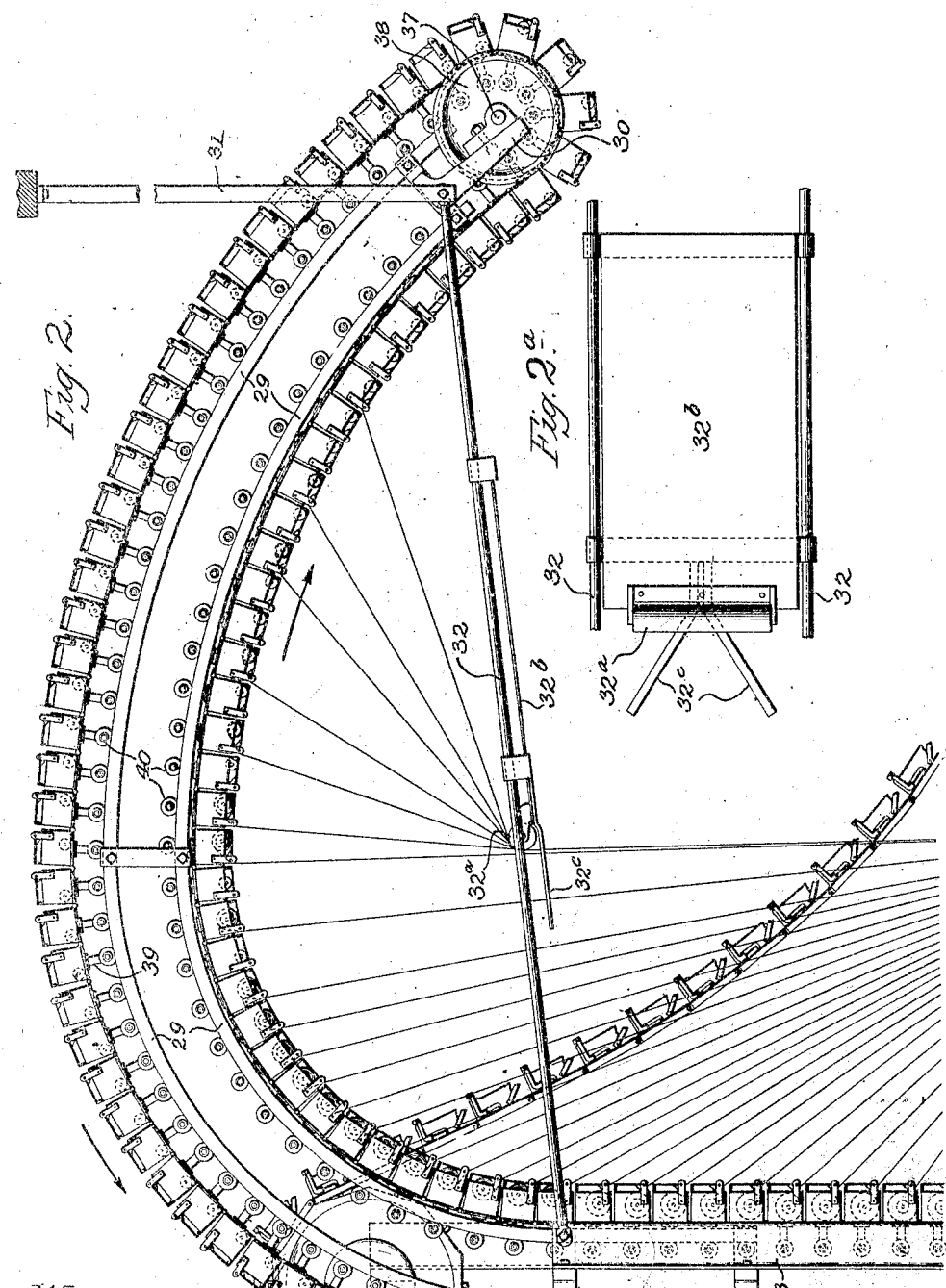

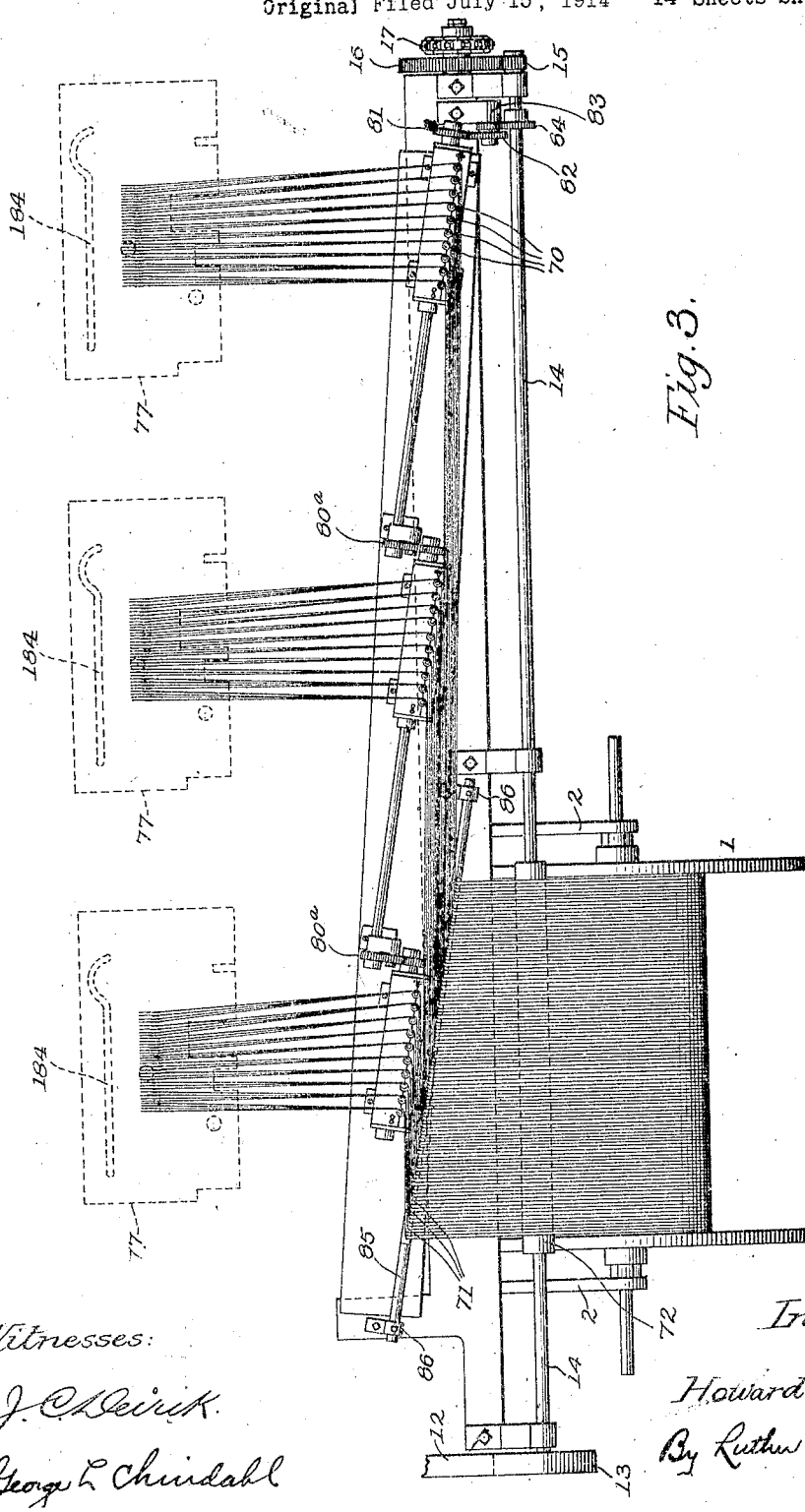

Aug. 17, 1926.
H. D. COLMAN
1,596,807
WINDER
Original Filed July 15, 1914    14 Sheets-Sheet 4
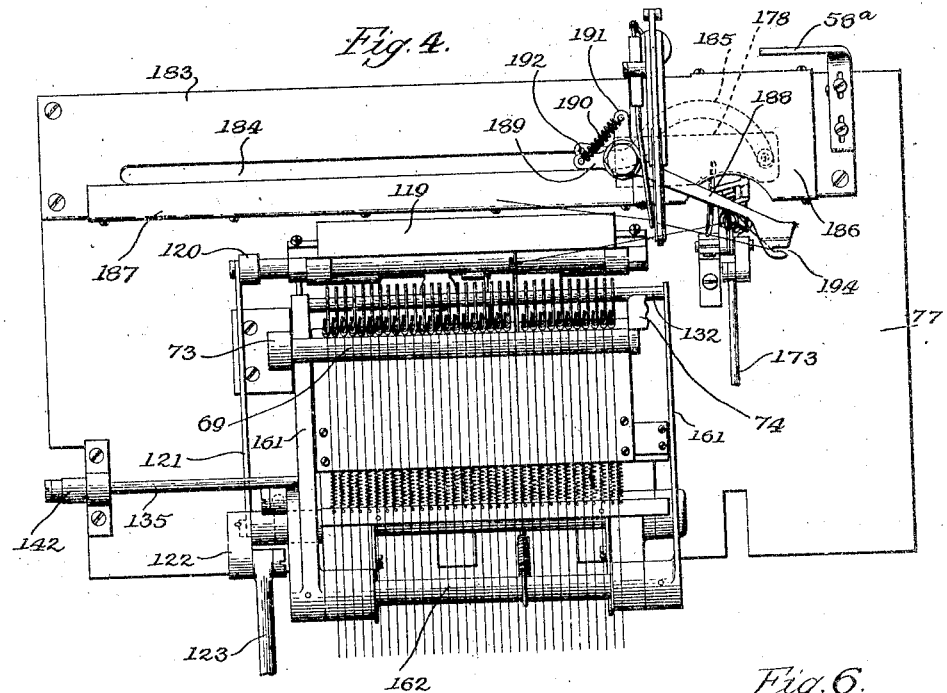
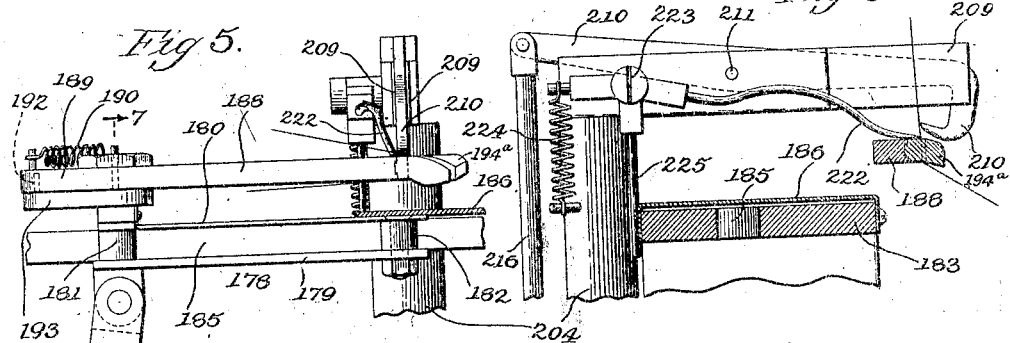
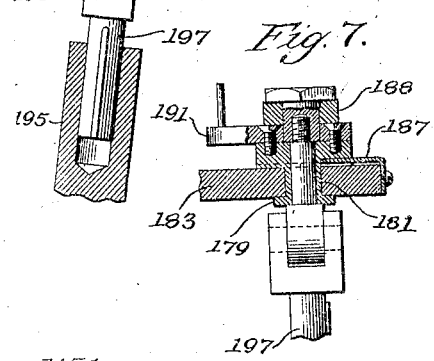
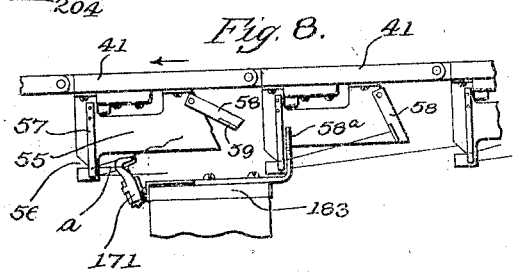
Witnesses:
J. C. Devitt.
George L. Chindahl
Inventor:
Howard D. Colman
By Luther L. Miller
Attorney Aug. 17, 1926.
H. D. COLMAN
1,596,807
WINDER
Original Filed July 15, 1914   14 Sheets-Sheet 5
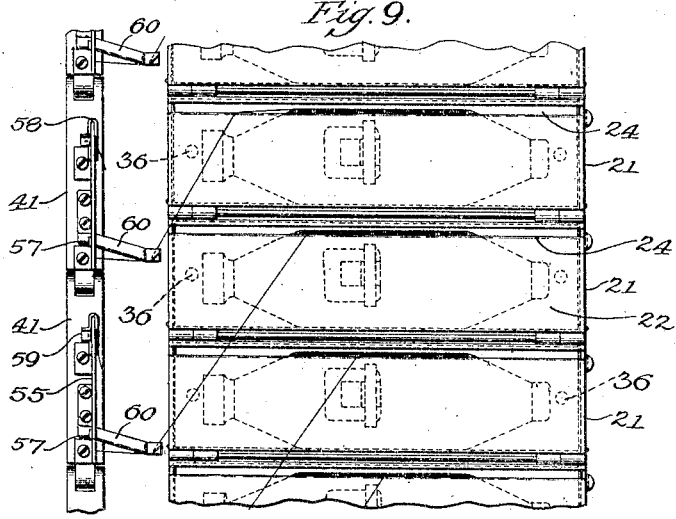
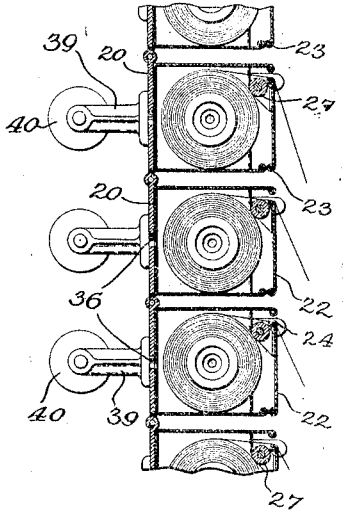
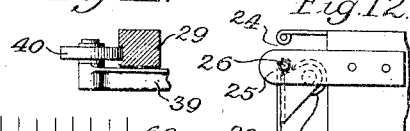
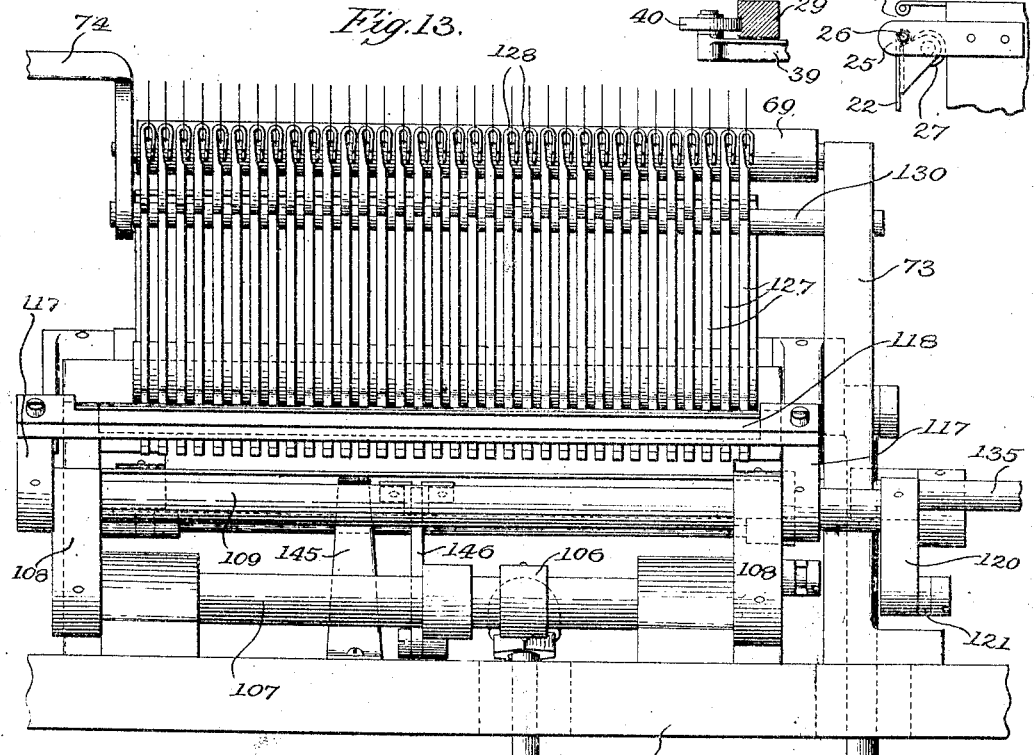
Witnesses:
Inventor:
Howard D. Colman
By Luther L. Miller
Attorney

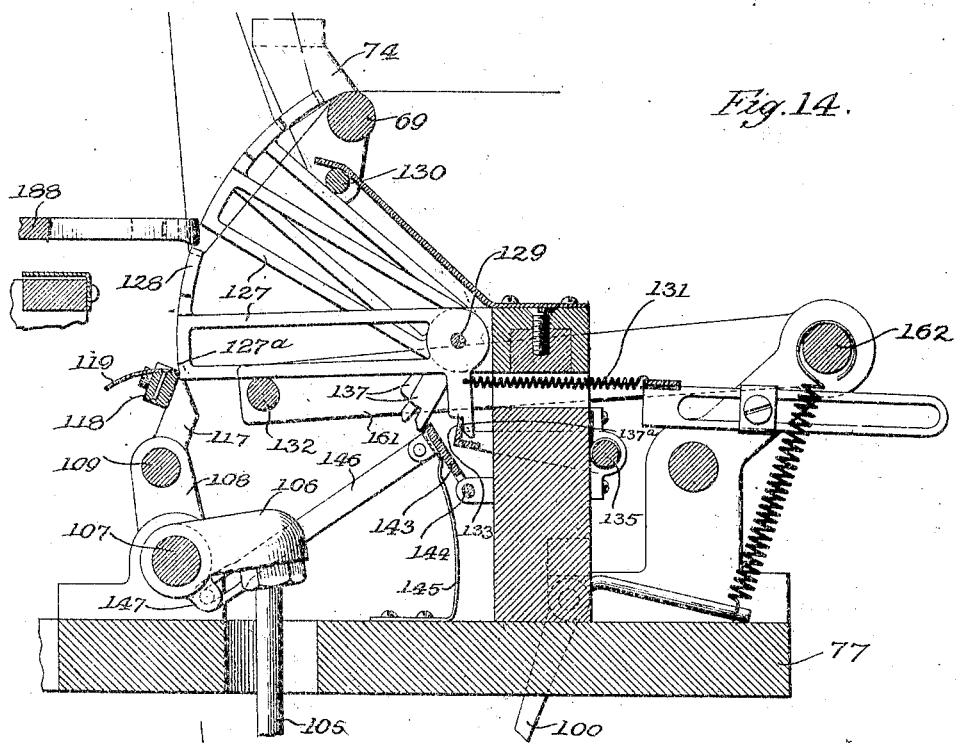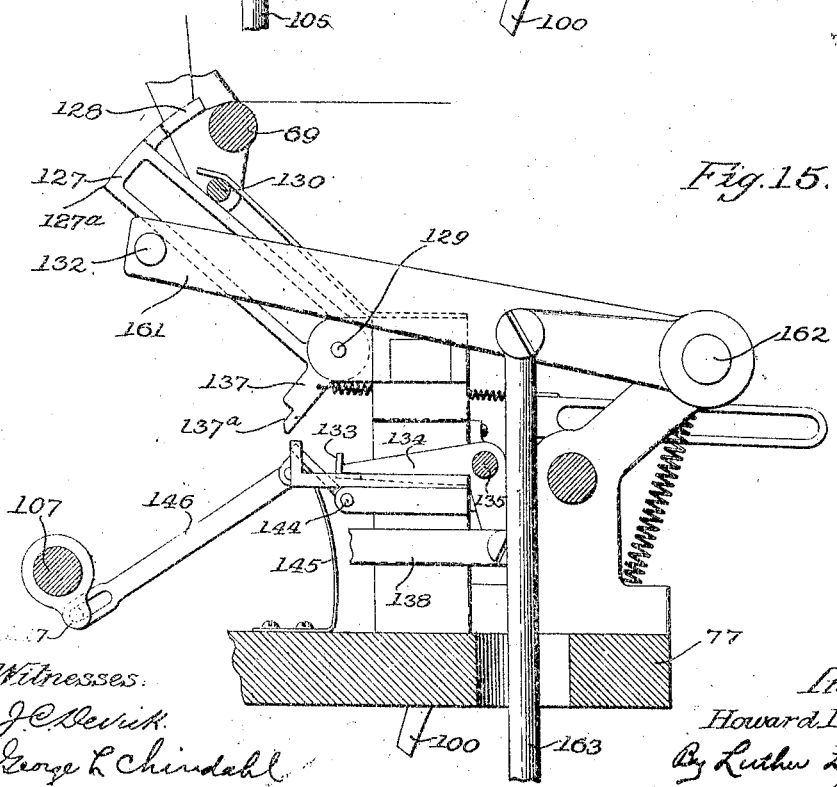

Aug. 17, 1926.
H. D. COLMAN
1,596,807
WINDER
Original Filed July 15, 1914    14 Sheets-Sheet 7
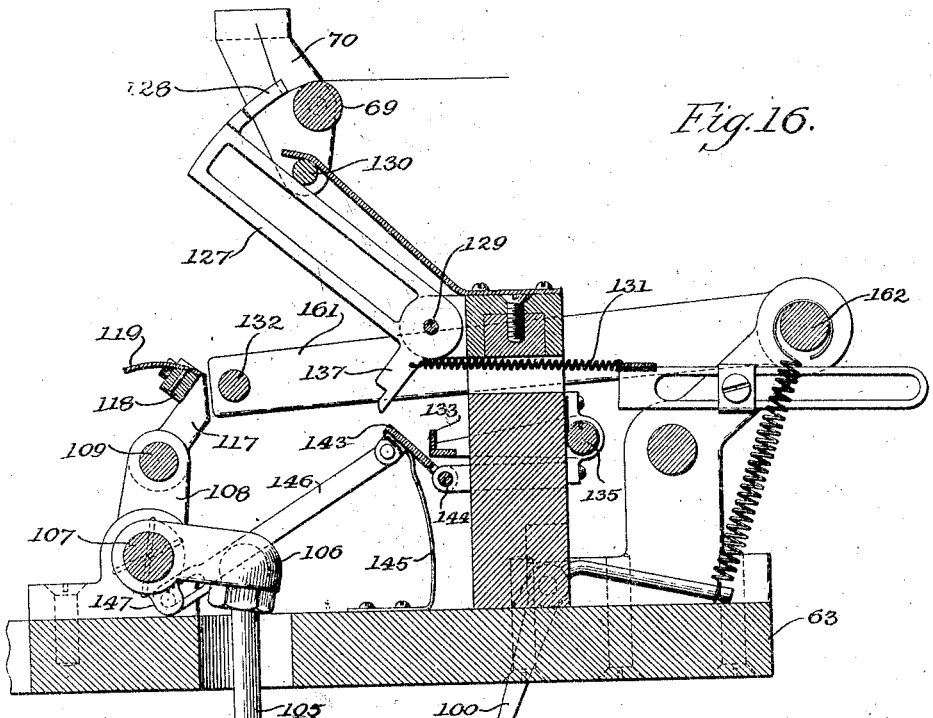
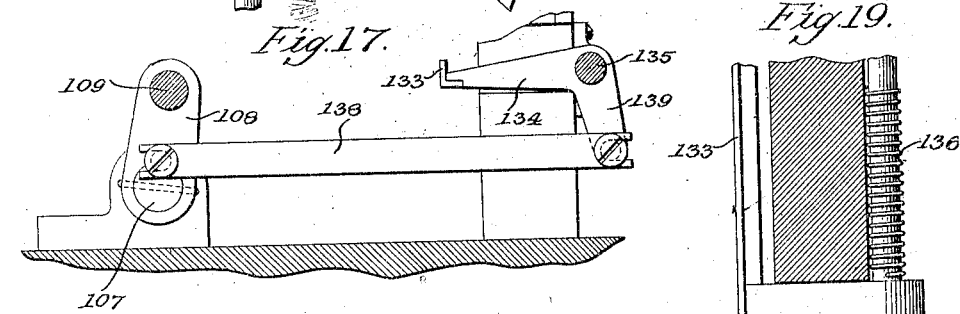
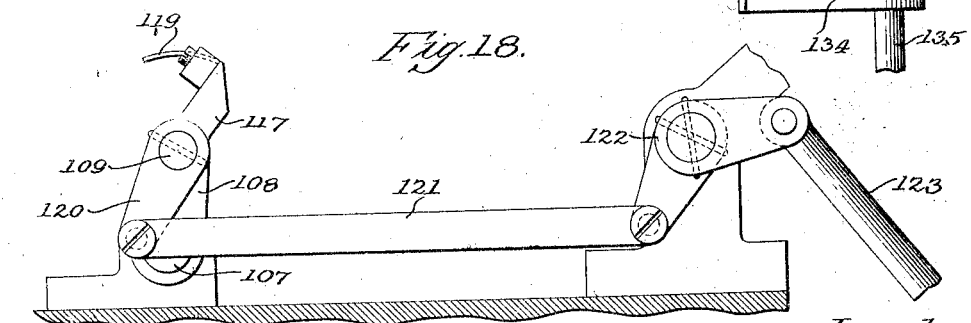
Witnesses:
Inventor:
Howard D. Colman
By Luther L. Miller
Attorney.

Aug. 17, 1926.

H. D. COLMAN 1,596,807

WINDER

Original Filed July 15, 1914    14 Sheets-Sheet 8

Witnesses:

Inventor:
Howard D. Colman
By Luther L. Miller
Attorney

Aug. 17, 1926.  1,596,807
H. D. COLMAN
WINDER
Original Filed July 15, 1914   14 Sheets-Sheet 9
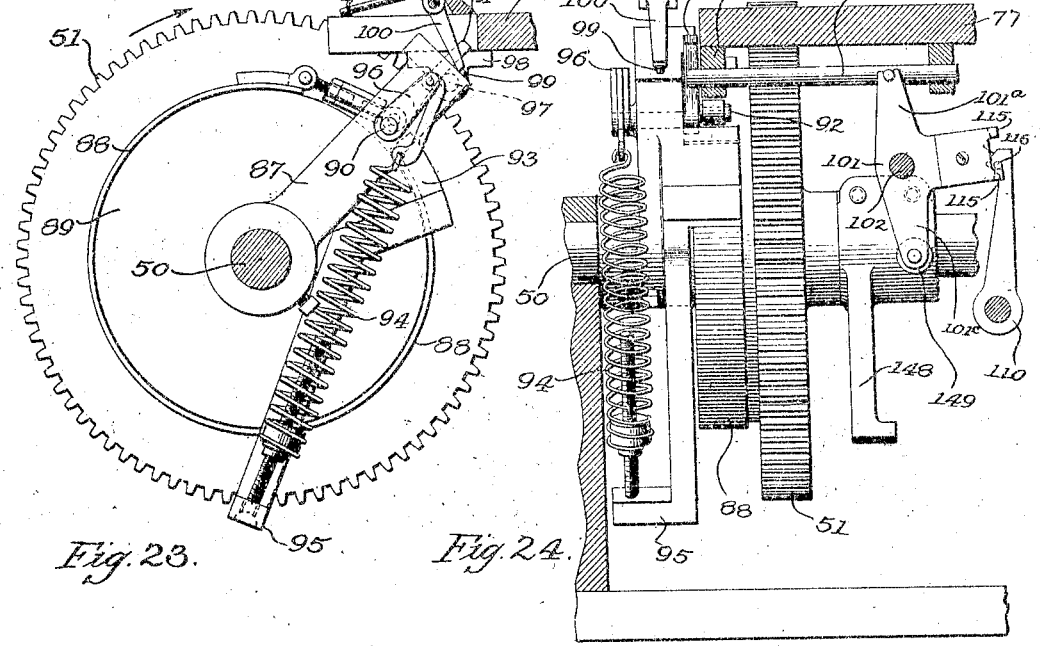
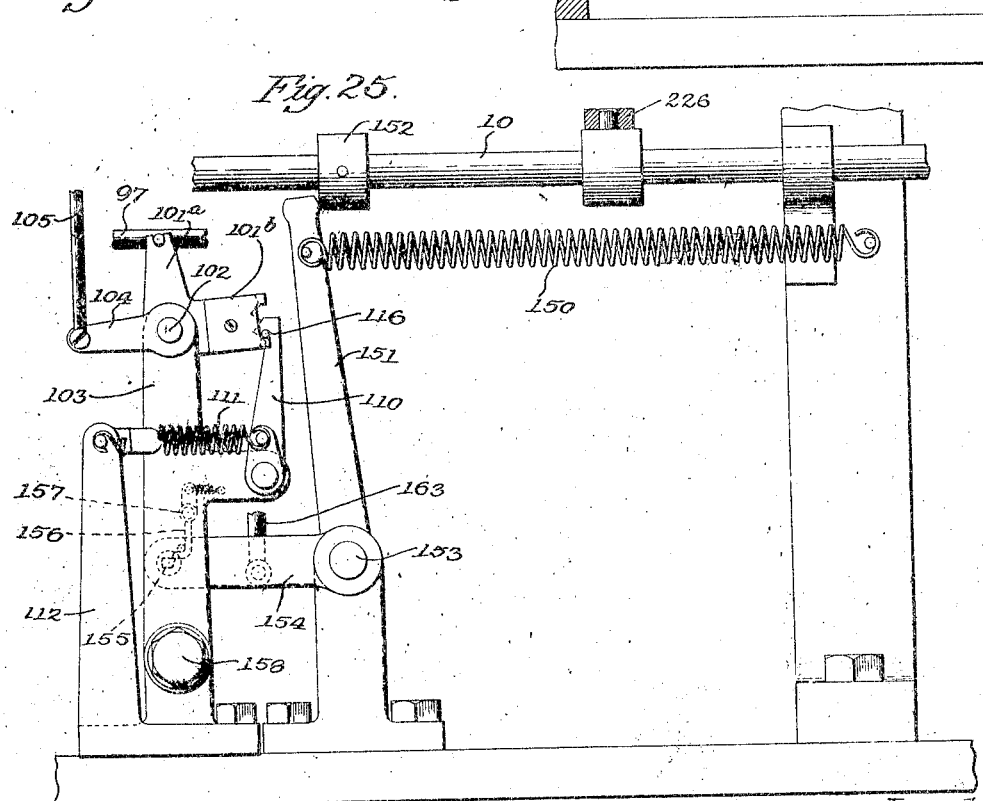
Witnesses:
J. C. Devick
George L. Chindahl
Inventor:
Howard D. Colman
By Luther L. Miller
Attorney Aug. 17, 1926. 1,596,807
H. D. COLMAN
WINDER
Original Filed July 15, 1914 14 Sheets-Sheet 10
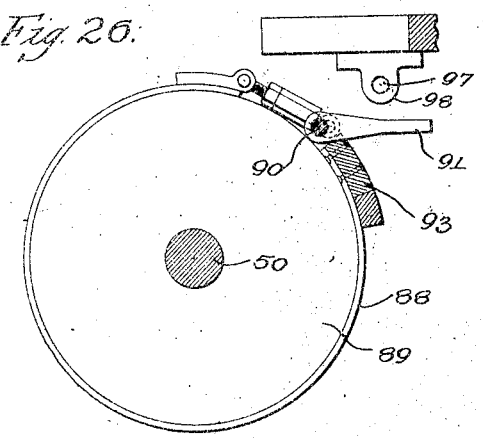
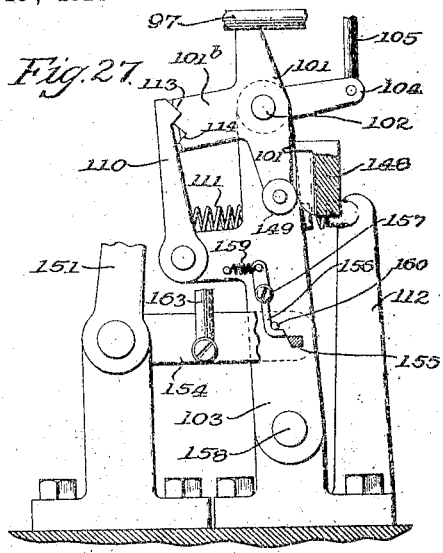
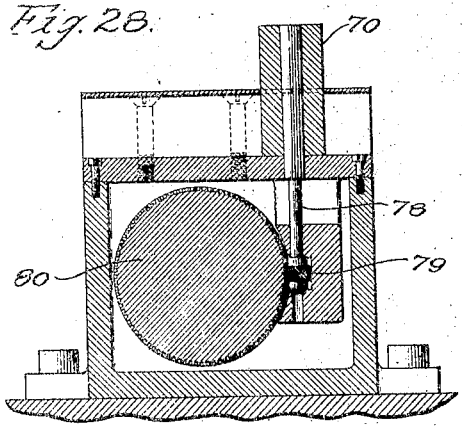
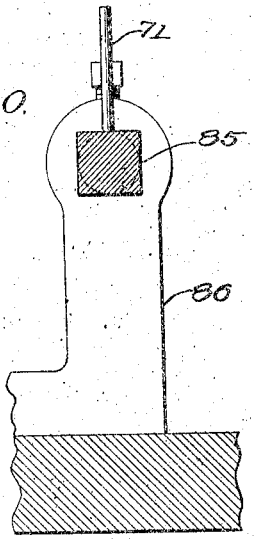
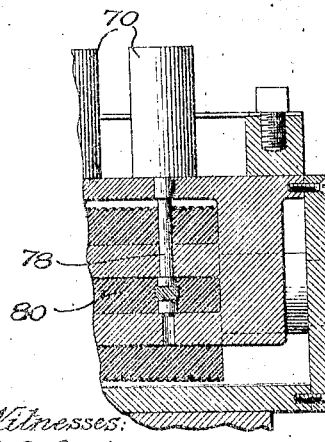
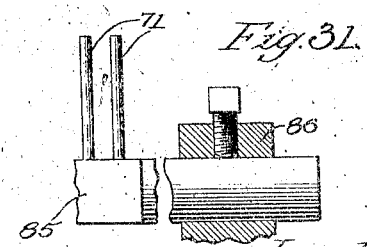
Inventor:
Howard D. Colman
By Luther L. Miller
Attorney

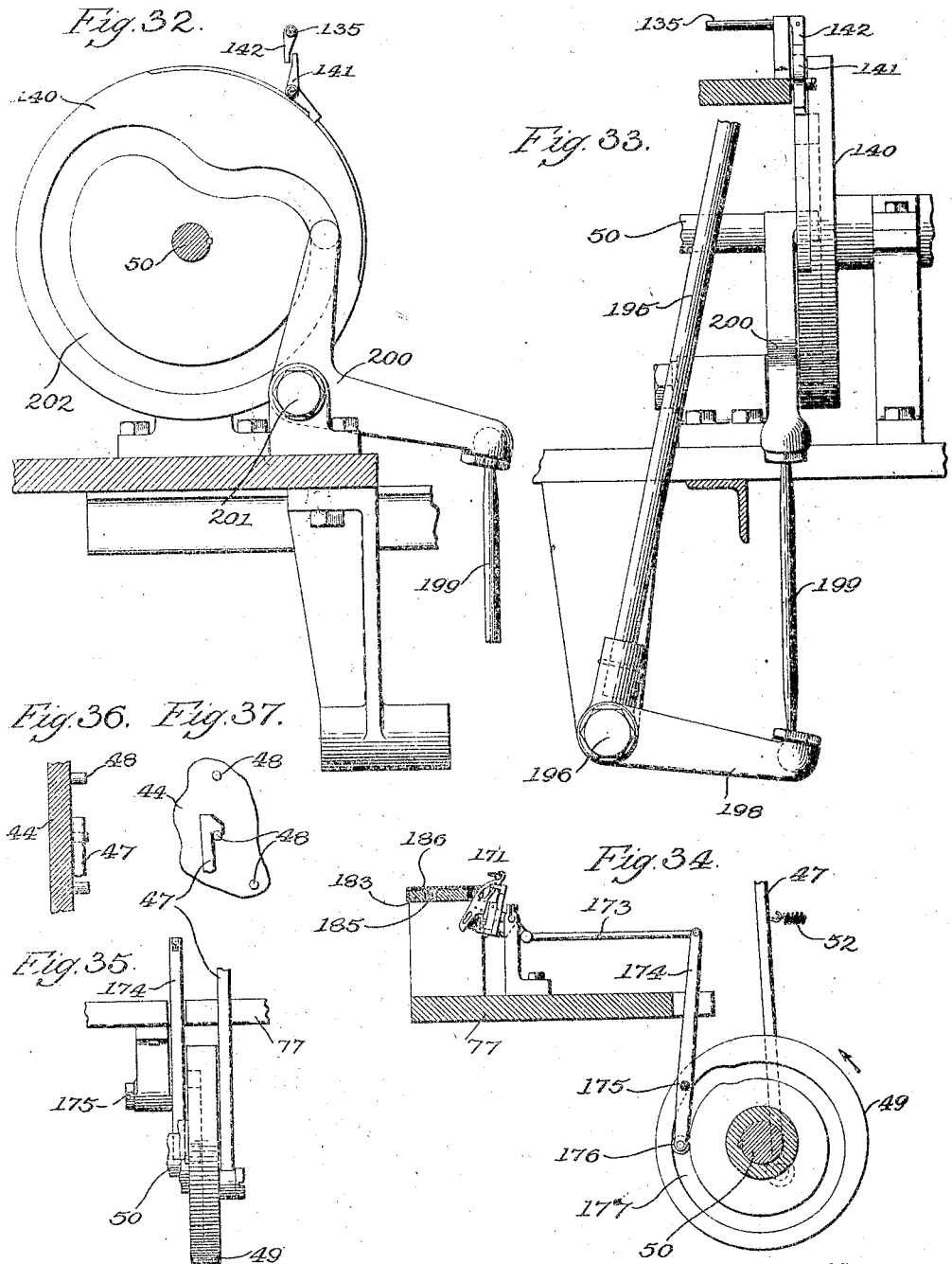

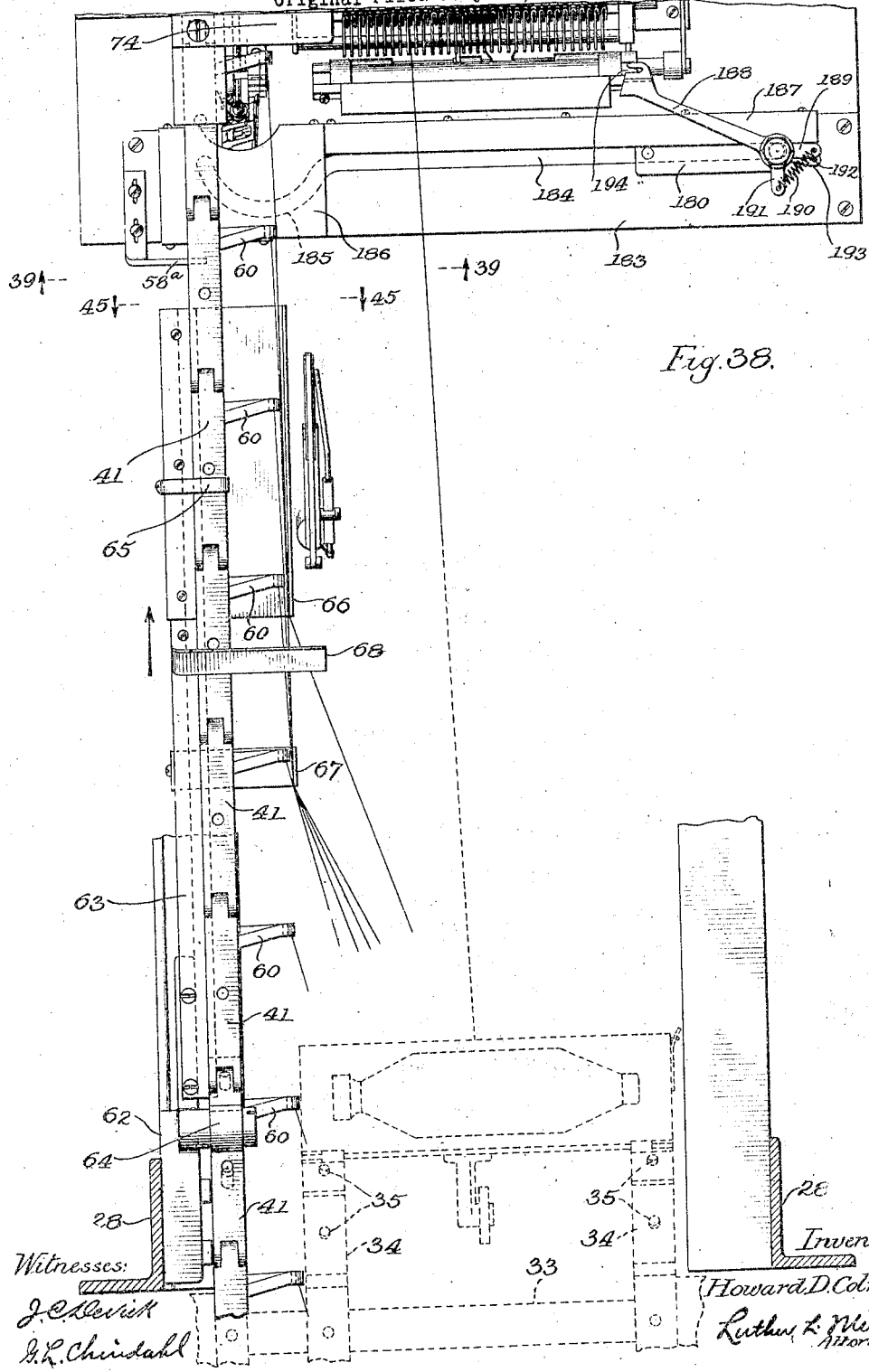

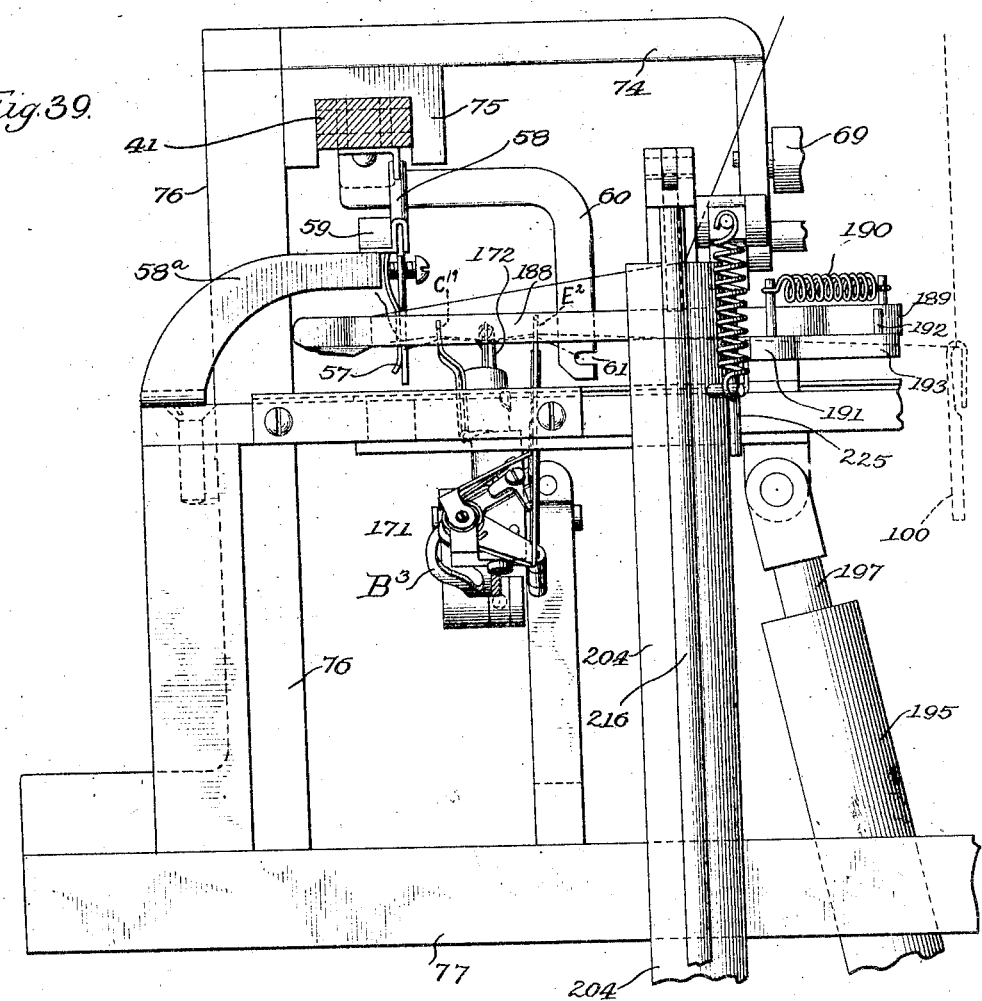

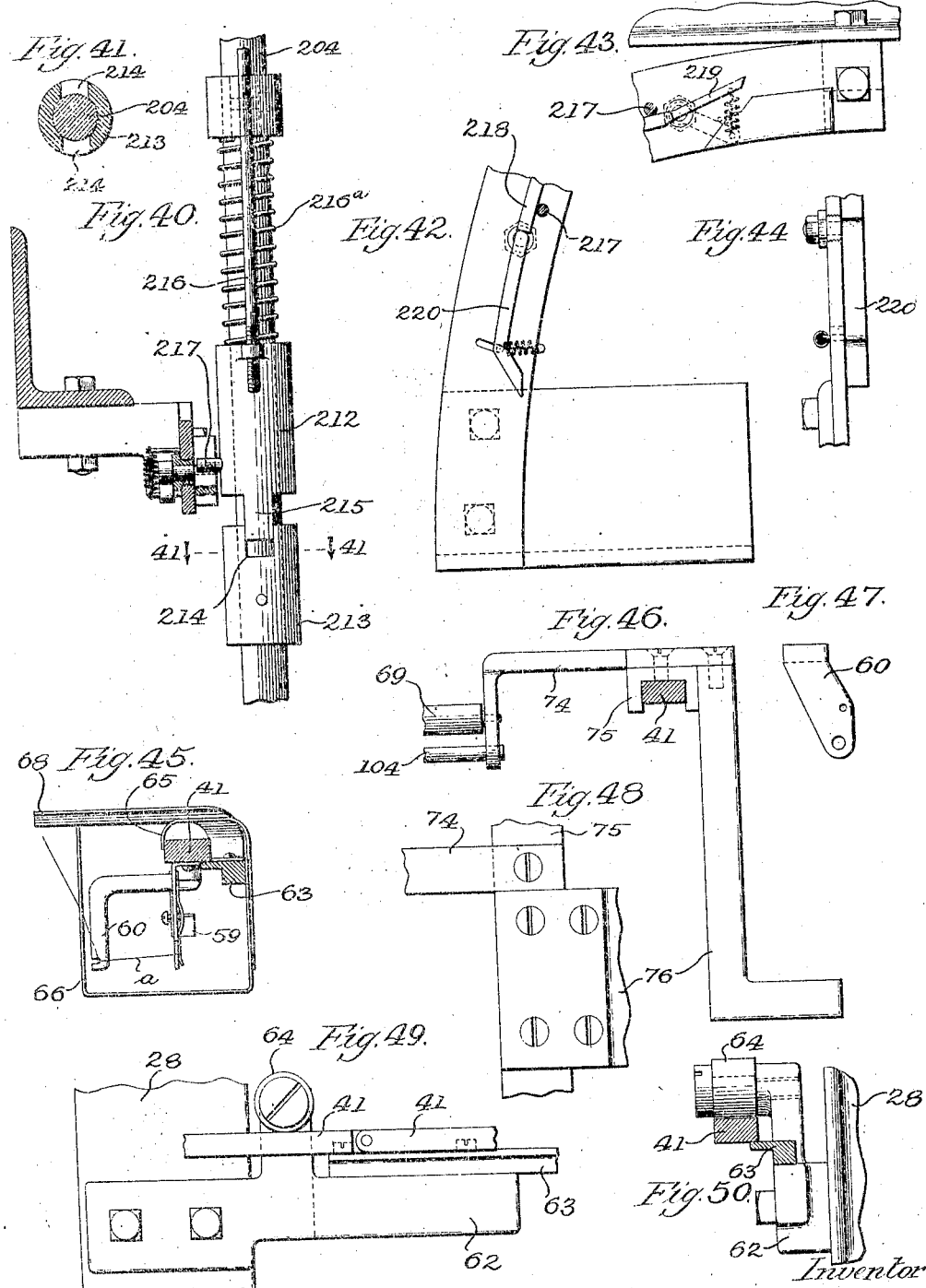

Patented Aug. 17, 1926.

1,596,807

UNITED STATES PATENT OFFICE.

HOWARD D. COLMAN, OF ROCKFORD, ILLINOIS, ASSIGNOR, BY MESNE ASSIGNMENTS, TO BARBER-COLMAN COMPANY, OF ROCKFORD, ILLINOIS, A CORPORATION OF ILLINOIS (1922).

WINDER.

Application filed July 15, 1914, Serial No. 851,053. Renewed December 5, 1924.

This invention relates particularly, although not exclusively, to winders of the type shown in Patent No. 1,184,077, dated May 23, 1916. The machine shown in said patent comprises a constantly-reciprocating drive carriage and a knotter-supporting carriage which also reciprocates constantly save for the brief stoppages incident to the exhaustion of threads. The knotter is reciprocated in proximity to the threads being wound. The end-portion of a reserve thread is carried upon the knotter carriage in readiness to be tied to any one of the running threads upon exhaustion of such running threads. After the reserve thread has been tied to an exhausted thread, another reserve thread is placed upon the knotter carriage when the latter reaches one end of its path of reciprocation. The means for placing reserve threads upon the knotter carriage comprises a chain carrying supports that hold the ends of reserve threads, and devices for transferring a thread from said supports to the supports on the knotter carriage.

One of the objects of the present invention is to simplify the operation of positioning reserve threads at the knotter. This object is attained by using a stationary knotter (the exhausted threads being carried to the knotter) and by locating the knotter in the path of the reserve threads carried by the thread chain, so that the movement of the chain suffices to position the threads at the knotter.

Another object of the invention is to provide means for stopping the machine in case a reserve thread is not tied to the exhausted thread.

Other objects of the invention will be apparent from the following description of the present embodiment.

Figure 22:
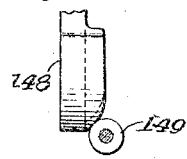
Figure 20:
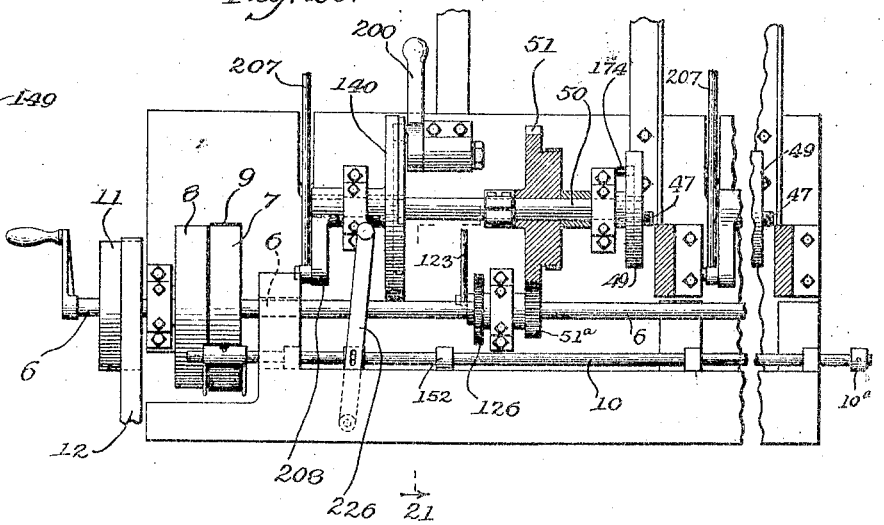

In the accompanying drawings, Figures 1 and 2 taken together constitute a side elevation of an apparatus embodying the features of my invention, the lower portion of the machine being shown in Fig. 1 and the upper portion in Fig. 2. Fig. 2ª is a top plan view of a device for controlling and guiding the threads. Fig. 3 is a top plan view of the rear portion of the apparatus. Fig. 4 is a top plan view of the detector mechanism, the knot-tying mechanism, the device for moving an exhausted thread into operative relation to the knot-tying mechanism, and the means for removing the waste thread ends. Fig. 5 is a view of said thread-placing mechanism and waste-end removing device, looking from the rear of the machine. Fig. 6 illustrates the waste-end removing device in side elevation and the device for placing the exhausted thread in the knotter, in section. Fig. 7 is a sectional view taken in the plane of dotted line 7—7 of Fig. 5. Fig. 8 is a side elevation of the knot-tying mechanism and the thread-carrying chain, viewed from the side opposite to that shown in Fig. 1 and from the left-hand side of Fig. 38. Fig. 9 is a fragmental front elevation of the thread-carrying chain and the bobbin-box chain. Fig. 10 is a fragmental vertical sectional view through the bobbin-box chain. Fig. 11 illustrates a means for guiding the bobbin-box chain. Fig. 12 is a fragmental detail of one of the bobbin boxes. Fig. 13 is a front elevation of the detector mechanism. Figs. 14, 15 and 16 are transverse sectional views of the detector mechanism in different positions. Figs. 17 and 18 are side elevations of parts comprised in said detector mechanism. Fig. 19 shows a portion of the detector mechanism in top plan view. Fig. 20 is a top plan view on the same scale as that used in Fig. 1, showing the driving means for the several mechanisms comprised in the machine. Fig. 21 is a vertical section taken approximately in the plane of dotted line 21—21 of Fig. 20. Fig. 22 is a detail illustrating a certain cam and the roller stud cooperating therewith. Fig. 23 illustrates a clutch or driving connection between the drive means and the shaft that actuates the several mechanisms concerned in the thread-uniting and resetting operations. Fig. 24 is a view of the parts shown in Fig. 23 and cooperating parts, looking from the right-hand side of Fig. 23. Fig. 25 is a view of some of the parts shown in Fig. 21, looking from the left-hand side of Fig. 21. Fig. 26 illustrates the construction of the clutch before referred to. Fig. 27 shows certain of the parts seen in Fig. 25, but viewed from the opposite side to that illustrated in Fig. 25, and in another position. Figs. 28 and 29 represent a tension-reducing mechanism. Figs. 30 and 31 illustrate guide pins for the threads running to the warp beam. Fig. 32 illustrates the cam for actuating the device that carries the exhausted thread to the knotter. Fig. 33 is another view of parts shown in Fig. 32. Fig 34 shows the knot-tying mechanism and its actuating means, together with a portion of the means for moving the bobbin-box chain and the thread-carrying chain. Fig. 35 is a view of certain of the parts shown in Fig. 34. Figs. 36 and 37 are detail views of a portion of the means for moving the bobbin-box chain and the thread-carrying chain. Fig. 38 is a plan view showing the horizontal reach of the thread-carrying chain and the parts adjacent thereto. Fig. 39 is a view taken in the plane of dotted line 39—39 of Fig. 38, but showing the mechanism in a different position, the view of Fig. 39 being upon an enlarged scale. Fig. 40 is a fragmental view of the means for removing waste thread-ends from the knot-tying mecanism. Fig. 41 is a section on line 41—41 of Fig. 40. Figs. 42 and 43 illustrate switch devices comprised in said removing means. Fig. 44 is a view taken from the left-hand side of Fig. 42. Fig. 45 is a section on line 45—45 of Fig. 38. Fig. 46 is a view of a bracket which assists to guide the thread-carrying chain and support a certain guide roller. Fig. 47 is a detail view of a bracket for supporting the other end of said roller. Fig. 48 is a fragmental top plan view of the first mentioned bracket. Fig. 49 is a side elevation of a guide for the thread-carrying chain, said guide being shown in top plan in Fig. 38. Fig. 50 is a view looking from the right-hand side of Fig. 49.

The illustrative embodiment herein shown is arranged to wind a comparatively small number of threads, but it will be understood that the invention may be embodied in a machine capable of operating on any desired number of threads. As herein shown, the replenishing and detector mechanisms are arranged in sections or units, all of the threads handled by the several units being wound upon a single beam. The machine illustrated herein consists of three such units placed side by side and supplying thread to a single beam. The beam revolves continuously. Each unit operates independently of the others, to tie a reserve thread to an exhausted thread whenever an exhaust occurs.

Each unit comprises a reel consisting in this instance of an endless chain of individual boxes for bobbins, the yarn from the required number of bobbins extending to the warp-beam; means for moving the chain so as to bring reserve bobbins into position for unwinding; and to carry away the emptied bobbins; a detector mechanism for detecting the exhaustion of any of the threads of the unit; an endless chain carrying clamps in which the yarn from reserve bobbins in the bobbin-box chain is clamped; and a knot-tying mechanism for uniting reserve threads to exhausted threads.

A multiple-threaded mass, which in the present embodiment is a section beam, is indicated at 1 in Figs. 1 and 3. It is supported in hooked arms 2 pivoted at 3 to the supporting frame, with the yarn upon the beam resting upon a driving drum 4. Said drum is fixed upon a shaft 5 journaled in the machine frame.

The drive shaft 6 (Fig. 20), which extends through all of the units, carries a tight pulley 7 and a loose pulley 8, 9 being the drive belt and 10 a belt-shifter rod. 10$^a$ is a stop collar for limiting movement of the rod 10 in one direction. Upon one end of the drive shaft is fixed a pulley 11 which carries a belt 12 running over a pulley 13 fast on one end of a shaft 14 (Fig. 3). On the other end of the shaft 14 is a pinion 15 meshing with a spur gear wheel 16 mounted on a stub shaft. Fixed with relation to the gear wheel 16 is a sprocket wheel 17 carrying a chain belt 18 (Fig. 1) which runs over a sprocket wheel 19 on the drum shaft 5. It will be understood that any other suitable means may be employed for rotating the warp-beam or other container upon which the yarn is to be wound.

Each bobbin-box chain is made up of links 20 (Fig. 10) and bobbin-boxes 21 secured to the links. Each box has a lid 22 hinged at 23, a slot or open space 24 (Fig. 9) being provided between the free edge of the lid and the adjacent wall of the box. The lid is locked in operative position by means of a spring latch 25 (Fig. 12) having an opening to receive a projection 26 on the lid. On the inner side of the lid, at its free edge, is an antifriction roller 27 against which the bobbin may revolve in some positions of the box.

The bobbin-box chain may be supported upon any suitable structure. Herein I have shown a framework comprising two uprights 28 (Figs. 1, 2 and 38) two curved grooved guide bars 29 (Figs. 2 and 11), supports 30 and 31 (Fig. 2), and two braces 32, all rigidly united. A shaft 33 (Figs. 1 and 38) is mounted in bearings on the uprights 28, and has two chain wheels 34 fixed thereon. Said wheels are provided with peripheral studs 35 adapted to enter openings 36 (Figs. 9 and 10) in the links 20. 37 (Fig. 2) is a shaft mounted in bearings on the support 30 and carrying two idler chain wheels 38. The guide bars 29 extend between the uprights 28 and the support 30, and serve to support the upper and lower runs of the bobbin-box chain. Each bobbin box is provided with an arm 39 and a roller 40, the latter being arranged to run in the groove of the guides 29.

As shown in Figs. 1 and 2, strands of yarn extend from bobbins in certain of the boxes 21 on the rear side of the bobbin-box chain, to the warp beam 1, the bobbin-box chain being moved step by step to carry full bobbins from the front side of the chain to the rear side thereof. Such movement of the chain also carries the empty bobbins upward and around to the front side of the chain, where they are replaced with full bobbins by the operative.

Suitable means may be provided for preventing the threads from assuming such a position that the threads when exhausted would fall upon the mechanisms located rearwardly of the detectors, or upon the sheet of threads extending from the detectors to the warp beam. Herein I have shown a roller $32^a$ (Figs. 2 and $2^a$) mounted upon a plate $32^b$ which is adjustably supported on the brace-rods 32. The roller $32^a$ also serves to hold the yarn from the several leading running bobbins in a plane where the device that carries the exhausted threads to the knot-tying mechanism can engage the yarn upon exhaustion.

Converging fingers $32^c$ (Fig. $2^a$) are secured to the plate $32^b$. These fingers and the roller $32^a$ gather together the threads which are nearly exhausted, so that when one of said threads exhausts, the free end shall cling to the other threads, and not fall down.

When a thread of a unit exhausts, the bobbin box chain of that unit moves one step, thus advancing all of the bobbins. The thread from the new bobbin which is to be tied to the exhausted thread is carried to the knot-tying mechanism by means consisting, in this instance, of an endless chain comprising links 41 (Figs. 9 and 38), said chain being supported on wheels 42, 43, 44 (Figs. 1 and 2). Each of said wheels is provided with pins 45 adapted to enter recesses in the links 41 to drive the chain. The wheel 42 is supported at the upper end of one of the uprights 28; the wheel 43 is fixed on the shaft 33; and the wheel 44 is rotatably supported on a standard 46. The last mentioned wheel is herein shown as rotated intermittently by means of a hooked bar 47 arranged to engage studs 48 (Figs. 1, 36 and 37) on the side of the wheel 44. The lower end of the bar 47 is pivoted to a disk 49 (Figs. 34 and 35) fixed on a shaft 50 (Fig. 20). This shaft is driven from the shaft 6 through the medium of gears 51 and $51^a$ (Figs. 20 and 21), the gear 51 being loose on the shaft 50 and being connected thereto only when a thread exhausts, as will appear hereinafter. The hooked bar 47 is held in position to engage the studs 48 by a coiled spring 52. Reverse rotation of the wheel 44 may be prevented in any suitable way, as by means of a pawl 53 on the wheel arranged to engage a ratchet-toothed disk 54 fixed to the standard 46. When the bar 47 rises, its beveled upper end slides past the stud to be next taken, whereupon the spring 52 draws the hook into engagement with said stud, so that downward movement of the bar causes the wheel 44 to turn through a distance equal to the distance between two adjacent studs. Such rotation of the wheel 44 causes the thread-carrying chain and the bobbin-box chain to move simultaneously.

Upon each link of the thread-carrying chain are devices for supporting the end-portion of the yarn extending from a full bobbin in one of the boxes of the bobbin-box chain (see Figs. 9 and 38). These devices may be of any suitable character; herein they are shown as comprising a plate 55 (Fig. 8) extending longitudinally of the chain and having a thread-receiving notch 56 in its leading edge. To one side of the plate 55 is attached a clamping spring 57 adapted to clamp the thread against the plate. To the rear portion of the plate 55 is pivoted a clamping arm 58 adapted to clamp the thread between itself and the plate, said arm having a projection 59 (Fig. 39) for engagement by a device to be later described for swinging said arm to release the thread. An angular arm 60 (Figs. 38, 39 and 45) is fixed to each link and projects toward the bobbin-box chain, said arm having in its outer end a notch 61 to receive the thread.

Referring to Figs. 8, 9 and 45: When the operative places a full bobbin in a box at the front side of the bobbin-box chain, she leads the thread from said bobbin into the notch 61, thence to the notch 56 and under the clamping spring 57, and then secures the end of the thread by means of the clamping arm 58. The operative places the bobbins about as shown in Fig. 9, but owing to the difference in the rate of travel of the bobbin-box chain and the thread-carrying chain, the latter gains on the former; so that by the time a given thread-end has reached the thread-uniting mechanism the bobbin from which said end extends will practically have just begun to ascend at the rear side of the bobbin-box chain. As the bobbin-box chain moves, the bobbins change their positions in the boxes, but such movement of the bobbins does not cause the threads to become slack, as the greater speed of the thread chain keeps the threads taut. The clamps 58 hold the threads with sufficient firmness to prevent the threads from pulling out of the clamps as the thread chain moves. Just before the strand $a$ (Fig. 45) that extends between the notches 56 and 61 is carried into contact with the knotter, the clamp 58 is opened (through contact of the projection 59 with a stationary member 58ᵃ, see Figs. 8 and 39), as said clamp would not permit the slippage required in laying the thread in the knotter and in looping the thread around the tying bill of the knotter. After the clamp 58 is opened, and while the knot is being tied, the end of the thread is yieldingly held by the clamping spring 57.

The portion of the thread-carrying chain between the wheels 43 and 44 may be prevented from sagging by any suitable means. Herein I have shown a bracket 62 (Figs. 38, 49 and 50) attached to one of the uprights 28. On said bracket is a rail 63 which supports the thread-carrying chain. Upward displacement of the chain is prevented by a roller 64 on the bracket 62, and lateral displacement is prevented, in part, by a guard 65 fixed to the rail 63. The strands extending from the bobbins to the arms 60 are held out of the way of the swinging arm that removes the waste end of the exhausted thread by means of two guards 66 and 67 (Figs. 1, 38 and 45) attached to the rail 63. 68 is a guide fixed to the rail 63 and serving to depress the reserve thread out of the way of the device that carries the exhausted thread to the knotter.

The active or running threads coming from the bobbin-boxes on the rear side of the bobbin-box chain extend through a series of detectors (Figs. 4 and 13), and thence over a guide roller 69. From the roller 69 of all of the units, the threads are guided to the warp beam by suitable guide means such as those shown in Fig. 3. As there indicated, the threads extend to the tension-reducing rolls 70 (Fig. 3), thence around a series of guide pins 71, and thence over a tension-reducing or guide roll 72 fixed on the shaft 14, to the warp beam.

The roller 69 is supported in brackets 73 and 74 (Figs. 4 and 13), the latter being fixed to a guide 75 (Figs. 46 and 48) for the thread-carrying chain, which guide is attached to a bracket 76. The brackets 73 and 76 are mounted upon a table 77.

The guide rolls 70 (Figs. 3, 28 and 29) are rotated in order to neutralize the tension created by the passage of the threads around the guide pins 71. Said rolls may be supported and driven in any suitable way. Herein they are shown as fixed to shafts 78, each of which shafts is provided with a spiral pinion 79 that meshes with a long spiral gear 80. The shafts of the gears 80 are connected by gear trains 80ᵃ, so that all may be driven by the gear train 81, 82, 83, 84 shown in Fig. 3, the gear 84 being mounted on the shaft 14.

The guide pins 71 (Figs. 30 and 31) are attached to a bar 85 which is mounted in brackets 86.

The function of the detectors hereinbefore alluded to is to set the shaft 50 in operation, the various mechanisms that cooperate in the uniting of the exhausted thread to a reserve thread and the resetting of the parts being driven from said shaft. The means for connecting the shaft 50 to the drive shaft 6 consists in this instance of a friction clutch comprising a bracket 87 (Fig. 23) fixed to the shaft 50, to which bracket is attached a clutch band 88 encircling a clutch disk 89 formed integral, in this instance, with the gear wheel 51. In the bracket 87 is journaled a pivot 90 to which is fixed a finger 91. One end of the clutch band is connected to a pin 92 (Fig. 24) on the finger 91, and the other end of said band is attached to the portion 93 of the bracket 87. A spring 94 connected at one end to the portion 95 of the bracket 87 and at its other end to an arm 96 fixed on the pivot 90 tends to rock the finger 91 in the direction to tighten the clutch band 88. The finger 91 normally rests against a stop rod 97 which is longitudinally slidable in guides 98. When the rod 97 is withdrawn from beneath the finger 91, the spring 94 tightens the clutch band 88 and causes the bracket 87 and shaft 50 to rotate with the constantly rotating gear wheel 51. In the normal operation of the machine, the stop rod 97 is returned into the path of the finger 91 before the shaft 50 has completed one revolution. When the finger 91 strikes said rod, the pivot 90 is turned as the bracket 87 continues rotating, thereby slackening the clutch band 88. The bracket 87 continues turning through momentum until a stud 99 (Figs. 23 and 24) has passed a spring locking dog 100. The spring 94 acting through the arm 96, pivot 90 and finger 91, holds the stud 99 against the dog 100, and thus locks the shaft 50 in a definite position of rest.

The means for withdrawing the stop rod 97 when a thread exhausts comprises a three-arm lever 101, the arm 101ᵃ being connected to the rod 97 as shown in Fig. 24. Said lever is fixed to a pivot 102 which has a bearing in a standard 103. Rigid with the pivot 102 is an arm 104 which is connected through a rod 105 to an arm 106 (Fig. 16), the arm 106 being fixed to a rock shaft 107. Also fixed to the shaft 107 are two arms 108 that carry a rock shaft 109. Normally the shaft 107 is held in the position shown in Fig. 16 by a dog 110 (Fig. 25) pivoted on the standard 103, said dog being acted upon by a spring 111 anchored to a post 112. In the arm 101ᵇ of the three-arm lever 101 are two notches 113 and 114 (Fig. 27) with which the dog 110 is adapted to engage. Stop lugs 115 on the arm 101ᵇ coact with a pin 116 on the dog 110 to limit the oscillatory movement of the three-arm lever.

Rigid with the shaft 109 (Fig. 16) are two arms 117 that carry a stop bar 118. The shaft 109 is constantly rocked by means shown in Figs. 18 and 21 and comprising the arm 120 rigid with the shaft 109, a link 121 connecting arm 120 to a bell crank 122, and a rod 123 extending between said bell crank and a crank pin 124 on a gear wheel 125 which is driven by the gear wheel 126 fixed on the shaft 6.

A shield plate 119 is fixed to the bar 118. This plate is curved on the arc of a circle concentric with the axis 109. The purpose of the plate is to support a detector that may fall when the rear edge of the bar 118 is behind the forward edge of the detector, and thus prevent the detector from being tossed up by said bar when the bar moves forward. If the detector were swung upwardly in the forward movement of the bar 118, the detector might not descend in time to interfere with the rearward movement of said bar, as will appear hereinafter.

The detectors 127 have hooks 128 through which the running threads extend. The detectors are supported on a pivot 129. Normally the threads hold the detectors up against a stop rod 130. When a thread exhausts, the detector for that thread drops, through the joint action of gravity and a spring 131, into contact with a rod 132. When a detector is down, its stop shoulder 127$^a$ lies in the path of movement of the bar 118 and prevents said bar from making its full movement, whereupon the continuing pressure of the link 121 causes the arms 117 and 120 to swing forward (the front end of the detector serving as a fulcrum), thereby turning the shaft 107. Such movement of the shaft 107 raises the arm 106 and thus turns the three-arm lever 101 until the dog 110 snaps into the upper notch 113. The stop rod 97 is thereby withdrawn from the finger 91, whereupon the spring 94 clutches the shaft 50 to the constantly rotating gear wheel 51.

Means is provided to hold the fallen detector down, and to insure that the detector is accurately located with reference to the device that carries the exhausted thread to the knot-tying mechanism. Said means comprises a bar 133 (Figs. 14 and 15) attached to arms 134 which are fixed to a rock shaft 135. A torsion spring 136 (Fig. 19) tends to rock the shaft 135 to lift the bar 133 into position to engage with the notched lower end of the arm 137 of a fallen detector. A link 138 (Fig. 17) extending between one of the arms 108 and an arm 139 on the shaft 135 restrains the spring 136 until a detector falls. When the bar 133 rises, it presses against the side 137$^a$ (Fig. 14) of the arm 137 and thus causes the fallen detector to move down against the stop rod 132 if the detector has not already assumed such a position.

After the device that carries the exhausted thread to the knot-tying mechanism has passed the series of detectors, and before the knot is tied, the bar 133 is withdrawn from the arm 137 by a cam disk 140 (Fig. 32) fixed on the shaft 50, said cam disk being arranged to move one arm of a lever 141, the other arm of the lever being arranged to move an arm 142 fixed on the shaft 135.

In case two exhausts occur in quick succession, the detector for the second exhausted thread would, unless prevented, drop into such position as to interfere with the operation of the device that picks up the first exhausted thread. I therefore provide a guard rail 143 (Figs. 14 and 16) pivoted at 144, a leaf spring 145 tending to swing said rail into position beneath the arms 137 of the detectors. A link 146 connected to said guard rail and to an arm 147 fixed on the shaft 107 restrains the spring 145 until a detector drops. The spring 145 and the slotted connection between the link 146 and the arm 147 permits the rail 143 to yield to allow the fallen detector to rise.

As shown in Fig. 14, when the detector falls it forms a loop in the exhausted thread.

As the knot is tied, the tension on the thread due to the rotation of the beam causes the detector to rise, the loop thus furnishing thread to the constantly-rotating beam. Such rising of the detector and the elasticity of the thread permit the winding to continue while the knotter is operating.

The means for returning the stop rod 97 into the path of the finger 91, and for restoring the rock shaft 107 to its normal position comprises a cam arm 148 (Figs. 22 and 24) fixed to the shaft 50 in position to engage a roller stud 149 on the arm 101$^c$ of the three-arm lever 101. In the usual operation of the parts, the detector has risen from its position behind the bar 118 before the cam arm 148 reaches the roller stud 149. Therefore the pressure of the cam arm 148 against the roller stud causes the three-arm lever to turn on its axis 102, the dog 110 snapping into the lower notch 114. In its movement, the three-arm lever projects the stop rod 97 into the path of the finger 91, and the shaft 107 is turned into the position shown in Fig. 16. If, however, the exhausted thread breaks while being carried to the knotter, or for any other reason a reserve thread is not tied to the exhausted thread, the detector does not rise from behind the bar 118, and the cam arm 148 effects a stoppage of the entire machine by the means to be now described.

The belt-shifter rod 10 (Fig. 20) is arranged to be slid in the direction to shift the drive belt 9 from the tight pulley 7 to the loose pulley 8 by means of a coiled spring 150 (Figs. 21 and 25) which is connected at one end to a fixed point in the machine frame and at its other end to a lever 151, said lever bearing against a collar 152 on the rod 10. The lever 151 is fixed upon one end of a rock shaft 153. To the other end of said shaft is attached an arm 154 carrying a stud 155 which normally lies beneath the lower end of a locking finger 156 pivoted at 157 on the standard 103. Said standard is pivoted at 158, but is normally held against the fixed post 112 by the spring 111. A spring 159 (Fig. 27) normally holds the finger 156 against a stop pin 160. When the standard 103 occupies the position shown in Fig. 25, the finger 156 prevents the spring 150 from moving the lever 151 and shifting the belt to the loose pulley. Should the detector not have risen before the cam arm 148 reaches the roller stud 149, the bar 118 will still be against the detector, hence the shaft 107 cannot return to its normal position and consequently the three-arm lever will be prevented from turning on its axis. In these circumstances, the standard 103 yields, against the tension of the spring 111, to allow the cam arm 148 to pass the roller stud 149. Such yielding movement of the standard withdraws the finger 156 from above the stud 155, whereupon the spring 150 shifts the drive belt to the loose pulley.

When the belt-shifter is thus operated, the detector is raised by the rod 132 (Fig. 15), said rod being supported by arms 161 which are fixed to a rock shaft 162. One of the arms 161 is connected by a rod 163 to the arm 154. The purpose in raising the detector is to facilitate rethreading.

The knot-tying mechanism may be of any suitable character. Herein I have shown a knotter 171 (Figs. 34 and 39) substantially similar to that fully disclosed in Patent No. 755,110 dated March 22, 1904. 172 is the rotatory tying bill by means of which the threads are looped and the waste ends trimmed off. $C^{19}$ is a thread guide located at one side of the tying bill. $E^2$ is a combination thread-guide, knot-tightener and knot-stripper located at the opposite side of the tying bill. $B^3$ is the oscillatory sector or actuating member by means of which the knotter is driven. Said sector is oscillated by means of a link 173 connected to a lever 174 pivoted at 175, said lever carrying an antifriction roller 176 that runs in the cam groove 177 of the disk 49.

As shown in Fig. 39, the knotter 171 is located between the vertical plane of the links 41 of the reserve-thread-carrying chain and the vertical plane of the notched ends of the arms 60, and at such a height that the chain carries the portion $a$ (Figs. 8 and 45) of the reserve thread into operative relation to the knotter. The thread-carrying chain is normally in such position that a reserve thread is in place under the tying bill 172, the end of the reserve thread having been released from the clamp 58 through the action of the stationary projection $58^a$ (Fig. 39). Said projection is located in the path of the lugs 59 as the thread-holding devices on the chain approach the knot-tying mechanism. As the chain brings a reserve thread into operative relation to the tying mechanism, the lug 59 on the clamp member 58 that holds the end of said thread strikes the projection $58^a$, thereby opening said clamp member. The exhausted thread is moved into operative relation to the knotter, so that said threads may be tied together, by means to be now described.

A slide 178 (Figs. 5 and 38) consisting of the plates 179 and 180 and the intermediate members 181 and 182 is arranged to slide longitudinally of, and in front of, the series of detectors. The slide 178 is mounted upon a table 183 having a guide-slot 184 therein through which the members 181 and 182 extend. The portion of the slot 184 adjacent to the knotter is curved, as at 185. The end of the table 183 adjacent to the knotter and the rear side of the table are covered by shield plates 186 and 187 to keep the threads from being soiled and from fouling on the slide 178.

Pivotally mounted on the slide 178 is an arm 188 having a lug 189 which is connected by a spring 190 to a lug 191 rigid with the slide. 192 is a stop pin on a lug 193 on the slide, against which pin the spring 190 normally holds the lug 189. In the free end of the arm 188 is a notch 194 adapted to receive an exhausted thread. If desired, the notch 194 may be formed in a block $194^a$ (Fig. 6) which is detachably secured to the arm 188, so that if the end of the arm should strike a detector, the block will be forced off the arm and thus avoid injury to the parts. As herein shown, the block $194^a$ may have a dovetail connection with the arm 188. The connection being sufficiently tight so as to retain the block in place under normal conditions.

When a thread exhausts, the slide 178 is moved from its initial position (shown in Fig. 38) to the position represented in Fig. 4, thereby carrying the arm 188 along the front side of the row of detectors, the notched end of said arm travelling just above the horizontal plane of the hook 128 of the fallen detector. The exhausted thread is thus received in the notch 194 of the arm 188 and drawn to a point beyond the knot-tying mechanism. The latter is mounted slightly forward of and at one end of the row of detectors. In order that the arm 188 may pass the knot-tying mechanism and lay the exhausted thread under the tying bill, the slot 184 is curved at 185, as described, so that when the member 182 of the slide 178 passes through said curved slot-portion the slide and the arm shall swing forward and then move rearwardly to lay the exhausted thread alongside the reserve thread.

The means for reciprocating the slide 178 comprises an arm 195 (Figs. 1, 5 and 33) pivoted at its lower end at 196, the upper end of said arm being tubular to receive a stem 197 which is pivoted to the slide. Rigid with the arm 195 is an arm 198 which is connected by a link 199 to one arm of a bell-crank 200 pivoted at 201. The other arm of said bell-crank carries a roller stud that lies in a cam groove 202 in the side of the cam disk 140.

The arm 188 is pivotally mounted on the slide 178, as described in order that the arm may yield to pass a detector that is partly down at the time when the arm returns to its normal position.

The portion of the exhausted thread which is trimmed off by the knot-tying mechanism is removed by an arm 204 (Fig. 1) pivoted at 205 to swing in a vertical plane located between the knot-tying mechanism and the adjacent end of the series of detectors. Rigid with the arm 204 is a crank-arm 206 which is connected by a rod 207 to a crank arm 208 fixed to the shaft 50. Mounted on the upper end of the arm 204 is a clamp of suitable construction, that herein shown consisting of two jaws 209 (Figs. 5 and 6) fixed to the arm 204, and a hook 210 pivoted at 211 to swing between said jaws. The means for swinging the hook 210 comprises a sleeve 212 (Fig. 40) slidable longitudinally of the arm 204 and held against rotation on the arm by means of a collar 213 fixed on the arm and having notches 214 that receives lugs 215 on the sleeve. The latter is connected to the hook 210 through the medium of a rod 216. The spring 216$^a$ tends to move the sleeve in the direction to swing the hook 210 into the space between the jaws 209. On the sleeve 212 is a stud 217 which in the oscillation of the arm 204 is arranged to follow a stationary cam 218 (Fig. 1). At the ends of the cam 218 are pivoted spring-held switch points 219 and 220 (Figs. 42 and 43), each of which is adapted to yield to allow the stud 217 to complete its movement in one direction, and is adapted to return into position to direct the stud to the other side of the cam 218 when the stud commences to move in the opposite direction. Thus when the arm 204 swings upward (toward the knot-tying mechanism), the stud 217 travels on the outer or convex side of the cam 218 and holds the hook 210 in the receiving position; and when the arm 204 starts on its downward swing the stud 217 is guided to the inner or concave side of the cam 218, the spring 216$^a$ moving the sleeve 212 downwardly until the lugs 215 stop against the bottoms of the notches 214, thereby swinging the hook 210 into clamping position. As the arm 204 starts upward, the switch point 220 guides the stud 217 onto the outer side of the cam 218, thus opening the clamp. At the lower limit of travel of the clamp is a suction tube 221 into which the waste end of the exhausted thread is drawn.

The parts are so proportioned, and the cam groove 202 (Fig. 32) and the crank arm 208 (Fig. 20) are so timed relatively to each other, that the clamp 209, 210 will assume a position above the path of movement of the notched end of the arm 188 before said notched end has passed the clamp on the trip to the knotter. Reference to Figs. 4, 5 and 6 will show that the notched end of the arm 188 will carry the upwardly extending strand of the exhausted thread under the clamp and in front of the operating end of the hook 210, the continuing movement of the slide 178 as the member 182 traverses the curved portion 185 of the slot 184 causing the arm 188 to pull said strand, first, forward along the lower side of the clamp, and then rearward into the hook 210.

222 is a finger pivoted at 223 adjacent to the clamp 209, 210. A spring 224 tends to swing the free end of the finger upwardly. Rigid with the finger is a pin 225 extending into position to impinge against the table 183 as the arm 204 approaches the upper limit of its movement, and thereby swing the finger 222 down close to the horizontal plane of the top of the arm 188, as shown in Fig. 6. Said finger will thereby be introduced between the arm 188 and the strand which is to be caught in the hook 210. As soon as the arm 204 commences to swing forward, the finger 222 will rise, and thus lift the thread, if the latter be lying on the finger, so that the thread will be received in the hook 210 before the hook rises into the space between the clamping jaws 209.

The operation of the machine may be summarized as follows: When a thread exhausts, the detector for that thread drops into the path of the constantly swinging bar 118, and by interfering with the movement of said bar causes the three-arm lever 101 to turn on its axis, thus withdrawing the stop rod 97. The friction clutch is thereby permitted to clutch the shaft 50 to the constantly rotating gear wheel 51, whereupon the following operations occur in approximately the order named. The crank 208 will advance the clamp 209, 210 into receiving position. The cam groove 202 will cause the slide 178 to carry the exhausted thread to the knot-tying mechanism 171 and the clamp 209, 210. The cam disk 140 acting on the lever 141 will withdraw the rail 133 from the fallen detector. The cam groove 177 will cause the knot-tying mechanism to unite the reserve and the exhausted threads and release them. As the beam in its rotation takes up the slack in the new thread, the latter is drawn off the arm 60, over the inclined upper edge of the guard plate 66, out from under the guide 68, and off the guard 67. The detector rises as soon as there is sufficient tension in the new thread to lift the detector. The arm 204 swings forward and down immediately after the knot has been tied, thus withdrawing the waste end of the exhausted thread. The cam groove 202 effects a return movement of the slide 178. The cam groove 177 restores the knot-tying mechanism to its initial position. The hooked bar 47 advances the bobbin-box chain and the thread-carrying chain one step, thereby bringing the next reserve thread into operative position in the knot-tying mechanism. The cam arm 148 turns the three-arm lever 101 on its axis 102, thereby placing the stop rod 97 in the path of the finger 91, and resetting the shaft 107 in normal position. As soon as the clutch band 88 is slackened and the dog 100 springs behind the stud 98, the shaft 50 comes to rest in the initial position. As the shaft 50 completes its revolution, the arm 204 rises to the position shown in Fig. 1.

If for any reason, the detector has not risen by the time the cam arm 148 acts upon the roller stud 149, the belt 9 is shifted to the loose pulley 8 by the spring 150, and the detector is raised by the rod 132, as hereinbefore described. In case of such stoppage of the machine, the operative corrects the fault, and shifts the belt to the tight pulley by means of the hand lever 226 (Fig. 20).

The operative keeps the bobbin boxes at the front side of the bobbin-box chain supplied with full bobbins, placing the free ends of the yarn on such bobbins on the thread chain, as described, removing from the clamps 57 the waste ends of the reserve threads that have been tied in, and removing the empty bobbins.

I have herein shown the thread chain as bearing pairs of thread-supporting devices, each pair consisting of a clamp 57 and a support 60 arranged to hold a portion of a reserve thread extending transversely of the direction of movement of the thread chain, the tying bill 172 and guides C¹⁹ and E² comprised in the knotter being located in the path of said transverse portion, and said clamp 57 and support 60 moving in planes which are at opposite sides of the knotter. However, the reserve threads may be otherwise attached to or supported by the thread chain, and the reserve thread advanced to the knotter by the thread chain may be placed in operative relation to the knotter by means other than those herein described.

It will be apparent from Figs. 1 and 2 that the arc of contact of the threads with the detectors increases as the bobbins rise. Inasmuch as the bobbins are becoming lighter as they rise, due to the unwinding of yarn, it will be seen that the tension in the thread due to the drag of the bobbin decreases as the tension due to the arc of contact with the detectors increases, these factors tending to produce uniformity in the tension of the thread.

I recognize the fact that various changes may be made in the embodiment herein illustrated without departing from the spirit and scope of the invention as set forth in the appended claims. The terms "thread," "yarn" and "twine" occurring in the claims are to be construed as synonymous.

I claim as my invention:—

1. A winder having, in combination, a movable creel for supporting thread carriers before, during and after unwinding; a continuously operating winding means to which the threads of certain of said carriers extend; a stationary series of detectors through which said threads extend; a series of devices moving with the creel for holding the ends of the threads on the other thread carriers; a stationary knotter; and means for moving the creel and said series of holding devices to carry the threads held by the latter directly into operative relation to the knotter.

2. In combination, continuously operating winding means, a movable creel adapted to carry a plurality of bobbins for supplying the winding means, and mechanisms operated automatically, when the supply from one of said bobbins to the winding means ceases, to move the creel to bring another bobbin to operative position and attach the leading end of the thread on the latter bobbin to the following end of the thread passing to the winding means, said mechanisms including a detector for each thread being wound, and a stationary knotter positioned to operate on said thread-ends at a point between the detector and said latter bobbin.

3. A winder having, in combination, means continuously to rotate a receiving thread carrier, supports for a plurality of supply bobbins, the threads from certain of said bobbins extending to said carrier; a stationary series of detectors for said threads; a stationary knotter; means to carry an exhausted thread from its detector to the knotter; and means to carry threads from the other bobbins to the knotter, the latter being positioned to operate upon the threads at a point between the detector and the supply bobbin.

4. A winder having, in combination, means continuously to rotate a receiving thread carrier; a support for a supply bobbin, the thread of which runs to said carrier; a support for a reserve bobbin; a stationary knotter for uniting the thread of the reserve bobbin to the running thread upon exhaustion of the latter; means to place both of said threads in the knotter; and means to form a loop in the running thread to serve as a supply for the winding means while the knotter is acting.

5. A winder having, in combination, means continuously to rotate a receiving thread carrier; supports for a plurality of supply bobbins, the threads from certain of said bobbins extending to said carrier; a stationary series of detectors for said threads; a stationary knotter; means to carry an exhausted thread from its detector to the knotter; and a series of clamps to hold the threads of the other bobbins, said clamps being movable to carry successive threads directly into the knotter the latter being positioned to operate upon the threads at a point between the detector and the supply bobbin.

6. A winder having, in combination, means for supporting and rotating a yarn-receiving receptacle; means for supporting an active bobbin and a reserve bobbin; means for uniting the yarn of the reserve bobbin to the exhausted thread of the other bobbin; means for carrying the exhausted thread to the uniting means; a clamp adapted to engage the waste end of the exhausted thread; means for moving the clamp from a position adjacent to the path of said carrying means to a discharging position; and means for opening and closing the clamp.

7. A winder having, in combination, a row of detectors, a knot-tying mechanism located at one end of the row, a member reciprocable in front of the row of detectors for carrying an exhausted thread to the knot-tying mechanism, a clamp movable into position above the path of movement of said member to receive a portion of the exhausted thread, means for opening and closing said clamp, and means for reciprocating the clamp into and out of receiving position.

8. A winder having, in combination, a stationary row of detectors; a knot-tying mechanism located at one end of the row; and means for carrying an exhausted thread from its detector to the knot-tying mechanism.

9. A winder having, in combination, a row of detectors; a knot-tying mechanism located at one end of the row; a slide reciprocable longitudinally of the row of detectors; and an arm mounted on said slide and arranged to engage an exhausted thread and carry said thread to the knot-tying mechanism.

10. A winder having, in combination, a row of pivoted detectors, each having a hook at its free end to receive a running thread; a knot-tying mechanism at one end of the row of detectors; and means arranged to travel in a plane adjacent to the hook of a fallen detector for carrying the exhausted thread to the knot-tying mechanism.

11. A winder having, in combination, a series of pivoted detectors, each detector having a thread-receiving hook at its free end; a knot-tying mechanism; a slide arranged to reciprocate longitudinally of the series of detectors; an arm on said slide having a notched thread-receiving end, said end being located in a plane adjacent to the thread-receiving hook of a fallen detector; and means for actuating said slide to carry an exhausted thread to the knot-tying mechanism.

12. A winder having, in combination, detectors to detect exhaustion of the threads being wound, a stationary normally-idle knotter having a tying bill and thread-guides at each side of the bill, a thread-carrier movable step by step, the movement of said carrier being controlled by the detectors, and a series of pairs of supports on said carrier to support a series of threads, each pair being arranged to support a thread-portion extending between the members of said pair transversely of the direction of movement of the carrier, and the tying bill and guides being located in the path of movement of such transverse thread-portions.

13. A winder having, in combination, a series of pivoted detectors, a rail movable into position beneath the series of detectors for limiting downward movement of detectors, and means actuated upon the falling of a detector for placing said rail in position to prevent the other detectors from descending to the same extent as such fallen detector, said rail being normally out of position to be engaged by any of the detectors.

14. A winder having, in combination, a series of detectors, a knot-tying mechanism; a shaft for driving said mechanism; means for driving the shaft; a clutch between the driving means and the shaft; a member for holding the clutch out of action; a reciprocating element whose movements are modified by engagement with a fallen detector; and connections between said element and said member for withdrawing the latter.

15. A winder having, in combination, a knot-tying mechanism, a shaft for actuating said mechanism; driving means for said shaft; a clutch for connecting the shaft to the driving means; a member for holding the clutch inoperative; a three-arm lever, the first arm of which lever is connected to said member; a row of detectors; a rock shaft; a second rock shaft carried by the first rock shaft; a bar mounted for oscillation on the second rock shaft; means for oscillating said bar, said detectors being so located that a fallen detector shall be in the path of movement of said bar; an arm fixed to the first rock shaft; a connection between said arm and the second arm of the three-arm lever; and a resetting cam on the actuating shaft arranged to engage the third arm of the three-arm lever.

16. A winder having, in combination, a knot-tying mechanism, a shaft for actuating said mechanism; driving means for said shaft; a clutch for connecting the shaft to the driving means; a member for holding the clutch inoperative; a three-arm lever, the first arm of which lever is connected to said member; a row of detectors; a rock shaft; a second rock shaft carried by the first rock shaft; a bar mounted for oscillation on the second rock shaft; means for oscillating said bar, said detectors being so located that a fallen detector shall be in the path of movement of said bar; an arm fixed to the first rock shaft; a connection between said arm and the second arm of the three-arm lever; a resetting cam on the actuating shaft arranged to engage the third arm of the three-arm lever; means tending to stop the driving means; a movable support for the three-arm lever; and means on said support for restraining said stopping means, said support being movable by the resetting cam to withdraw said restraining means when a detector is in the path of said bar.

17. A winder having, in combination, a plurality of units each comprising bobbin-supporting means, detector means, and means controlled by the detector means for uniting reserve threads to exhausted threads; and means for rotating a warp beam to which all of the threads of the units extend.

18. A winder having, in combination, an endless series of bobbin boxes, a mechanism for operating upon threads extending from the boxes, means for supporting the series to move upwardly in front of and rearwardly over the mechanism, and means for gathering together the threads extending from the leading bobbins.

19. A winder having, in combination, a plurality of units each comprising an endless series of bobbin-supports, detector means, and a stationary knotter controlled by the detector means for uniting reserve threads to exhausted threads; and means for rotating a warp beam to which all of the threads of the units extend.

20. A winder having, in combination, an endless series of bobbin boxes, a mechanism for winding the threads extending from the boxes, means for supporting the series to move upwardly in front of and rearwardly over the mechanism, an elevated guide over which extend the threads from the leading bobbins, and means to prevent the last mentioned threads, when exhausted, from dropping behind said guide.

21. A winder having, in combination, a stationary knotter, an endless series of bobbin supports, an endless chain, a thread clamp on said chain, and a thread support on said chain, said clamp and thread support being located in planes parallel with the chain, said planes being at opposite sides of the knotter.

22. A winder having, in combination, a stationary knotter, an endless chain arranged to run in a vertical plane; and pairs of devices on the chain for supporting threads, the devices of each pair being arranged in vertical planes located at opposite sides of the knotter.

23. A winder having, in combination, a knotter, an endless series of bobbin supports, an endless chain, a thread clamp on said chain, and a thread support on said chain, said clamp and thread support being in planes located at opposite sides of the knotter, said thread support being at the side which is toward the series of bobbin supports.

24. A winder having, in combination, a series of bobbin supports, a series of detectors behind the bobbin supports, a series of thread carriers at one side of the series of bobbin supports and series of detectors, a stationary knotter located substantially in the vertical plane of the series of thread carriers, the latter being arranged to carry reserve threads to said knotter, and a device for carrying an exhausted thread to the knotter.

25. A winder having, in combination, a stationary knotter, a series of bobbin supports, an endless chain located beside the series of bobbin supports, a thread clamp on said chain, and a thread support on said chain, said clamp and thread support being in planes located at opposite sides of the knotter, said thread support being at the side which is toward the series of bobbin supports.

26. A winder having, in combination, a series of bobbin supports, a series of detectors, a series of thread carriers at one side of the series of bobbin supports and series of detectors, a stationary knotter located substantially in the vertical plane of the series of thread carriers, the latter being arranged to carry threads to said knotter, and a device for carrying an exhausted thread to the knotter, said device being reciprocable transversely of the series of detectors.

27. A winder having, in combination, a stationary knotter, a series of bobbin supports, a thread carrier, a thread clamp on said carrier, and a thread support on said carrier, said clamp and thread support being in planes located at opposite sides of the knotter, said thread support being at the side which is toward the series of bobbin supports.

28. A winder having, in combination, a series of bobbin supports, a series of detectors, thread-carrying devices at one side of the series of bobbin supports and series of detectors, a stationary knotter located adjacent to the thread-carrying devices, the latter being arranged to carry threads to said knotter, and a device for carrying an exhausted thread to the knotter.

29. A winder having, in combination, means for supporting and rotating a warp beam; a bobbin box chain; the threads from a plurality of the boxes of said chain extending to said beam, a series of detectors, there being a detector for each of said threads, a stationary knotter for uniting reserve threads to exhausted threads; and means for carrying threads to the knotter.

30. A winder having, in combination, means for supporting and rotating a warp beam; means for supporting bobbins, a series of detectors; a reserve thread chain, some of the threads of the bobbins extending to the detectors and thence to the beam and others extending to the reserve thread chain, a stationary knotter for uniting a reserve thread to an exhausted thread, said knotter being close to the path of movement of the thread chain; and means for carrying exhausted threads to the knotter.

31. A winder having, in combination, means for supporting and rotating a warp beam; means for supporting bobbins; a series of detectors; a reserve thread chain, some of the threads of the bobbins extending to the detectors and thence to the beam and others extending to the reserve thread chain, a stationary knotter for uniting reserve threads to exhausted threads, and a device for carrying exhausted threads to said knotter, said device being arranged to reciprocate along and in proximity to said series of detectors.

32. A textile machine comprising a stationary knotter, an endless vertically extending series of bobbin boxes, and an endless movable chain, a portion of which chain extends parallel with and adjacent to a portion of said series of bobbin boxes, another portion of said chain extending into operative relation to said knotter, said chain being provided with means for attaching thereto threads extending from bobbins in said bobbin boxes.

33. A winder having, in combination, means for supporting a series of threads in a sheet, and means for joining another thread to any one of the threads of said series comprising a stationary knotter and a device arranged to be reciprocated transversely of said series of threads and carry any exhausted thread to the knotter.

34. A winder having, in combination, a mechanism for winding a plurality of threads; a stationary knotter; means for supporting a reserve thread in operative relation to the knotter; mechanism for placing any exhausted thread in position to be acted upon by the knotter; and detectors controlling the operation of said thread-placing mechanism and said knotter.

35. A winder having, in combination, supports for a plurality of yarn masses being unwound, supports for a plurality of reserve yarn masses, a stationary series of detectors to detect exhaustion of the threads of the yarn masses being unwound, a stationary normally-idle knotter, and a thread-carrier independent of said yarn mass supports and supporting the threads of the reserve yarn masses and movable step by step to carry such reserve threads singly and successively into operative relation to the knotter, the movement of the carrier and the operation of the knotter being controlled by the detectors.

36. A winder having a stationary knotter, a member movable toward the knotter, means on said member to support a thread at two points in position to enter the knotter, a clamp on said member to hold the end of said thread, and means near the knotter to open the clamp.

37. A winder having a stationary knotter, a member movable toward the knotter, two supports on said member located in planes at opposite sides of the knotter and adapted to support a thread in position to enter the knotter, a clamp on said member to hold the end of said thread, and means to open the clamp.

38. A winder having, in combination, means for supporting and rotating a yarn-receiving receptacle; means for supporting an active bobbin and a reserve bobbin; a knotter for uniting the yarn of the reserve bobbin to the yarn of the other bobbin and for trimming off the waste ends; a clamp adapted to receive the waste end of one of the threads; means for bodily moving the clamp from a position adjacent to the knotter to a discharging position and for returning the clamp; and means for opening and closing the clamp.

39. A winder having, in combination, means for supporting and rotating a yarn-receiving receptacle; means for supporting an active bobbin and a reserve bobbin; a knotter for uniting the yarn of the reserve bobbin to the yarn of the other bobbin and for trimming off the waste ends; a pivoted arm; a clamp on said arm adapted to receive the waste end of one of the threads; means for swinging the arm to move the clamp from a position adjacent to the knotter to a discharging position and for returning the arm; and means for opening and closing the clamp.

40. A winder having, in combination, means for supporting and rotating a yarn-receiving receptacle; means for supporting an active bobbin and a reserve bobbin; a knotter for uniting the yarn of the reserve bobbin to the exhausted thread of the other bobbin and for trimming off the waste ends; means for carrying the exhausted thread to the knotter; a clamp adapted to receive the waste end of the exhausted thread; means for moving the clamp from a position adjacent to the path of said carrying means to a discharging position and for returning the clamp; and means for opening and closing the clamp.

41. A winder having, in combination, a row of detectors, a knotter located at one end of the row, means for placing a reserve thread in the knotter, a member reciprocable in front of the row of detectors for carrying an exhausted thread to the knotter, a clamp movable into position above the path of movement of said member to receive a portion of the exhausted thread, means for opening and closing said clamp, and means for moving the clamp into and out of receiving position.

42. A winder having, in combination, a stationary row of detectors, each engaging a running thread; a knotter stationarily located at one end of the row; and means for carrying a running thread from its detector to the knotter.

43. A winder having, in combination, a row of detectors; a knotter stationarily located at one end of the row; a slide reciprocable longitudinally of the row of detectors; and an arm mounted on said slide and arranged to engage a running thread and carry said thread to the knotter.

44. A winder having, in combination, a series of pivoted detectors, each detector having a thread-receiving hook at its free end; a knotter located at one end of the series of detectors; means for placing a reserve thread in the knotter; a slide arranged to reciprocate longitudinally of the row of detectors; an arm on said slide having a notched thread-receiving end, said end being located in a plane adjacent to the thread-receiving hook of a fallen detector; means for actuating said slide to carry an exhausted thread to the knotter; and means to swing the arm to lay the thread in the knotter.

45. A winder having, in combination, a series of detectors, a stationary knotter; a clutch controlling the operation of the knotter; a member for holding the clutch out of action; an element whose movements are modified by engagement with a fallen detector; and connections between said element and said member for withdrawing the latter.

46. A winder having, in combination, a stationary knotter, a clutch controlling the operation of the knotter; a device for holding the clutch inoperative; a three-arm lever, the first arm of which lever is connected to said device; detectors; a rock shaft; a second rock shaft carried by the first rock shaft; a member mounted for oscillation on the second rock shaft; means for oscillating said member, said detectors being so located that a fallen detector shall be in the path of movement of said member; an arm fixed to the first rock shaft; a connection between said arm and the second arm of the three-arm lever; and resetting means arranged to engage the third arm of the three-arm lever.

47. A winder having, in combination, a stationary knotter; a clutch controlling the operation of the knotter; a device for holding the clutch inoperative; a three-arm lever, the first arm of which lever is connected to said device; detectors; a rock shaft; a second rock shaft carried by the first rock shaft; a member mounted for oscillation on the second rock shaft; means for oscillating said member, said detectors being so located that a fallen detector shall be in the path of movement of said member; an arm fixed to the first rock shaft; a connection between said arm and the second arm of the three-arm lever; a resetting cam driven by said clutch and arranged to engage the third arm of the three-arm lever; means tending to stop the driving means; a movable support for the three-arm lever; and means on said support for restraining said stopping means, said support being movable by the resetting cam to withdraw said restraining means when a detector is in the path of said member.

48. A winder having, in combination, means for continuously winding a thread, a knotter for uniting said thread, when exhausted, to a reserve thread, and a detector held by the thread being wound, said detector controlling the operation of the knotter and being movable out of normal position upon exhaustion of the thread to form a loop in said thread, which loop supplies thread to the winding means while the knotter is acting, said detector being returned to normal position under the tension of the threads.

49. A winder having, in combination, means for continuously winding a thread, a knotter for uniting said thread when exhausted to a reserve thread, and a detector in constant engagement with said thread at a point between the winding means and the knotter, said detector controlling the operation of the knotter.

50. A winder having, in combination, a detector, mechanisms for uniting a reserve thread to an exhausted thread, said mechanisms being controlled by the falling of the detector, said detector being arranged to rise under the tension of the united threads, and stopping means actuated through failure of the detector to rise.

51. A winding having, in combination, a drum for rotating a warp beam, means to drive the drum, detectors, mechanisms for uniting a reserve thread to an exhausted thread, said uniting mechanisms being controlled by the falling of a detector, said fallen detector being arranged to rise under the tension of the united threads, and a device for disconnecting the driving means from the drum, said device being actuated through failure of a fallen detector to rise.

52. A winder having, in combination, means for rotating a receiving yarn carrier, a driving means for the entire machine, mechanisms for uniting a reserve thread to an exhausted thread, a device for disconnecting the driving means from the machine, and detectors arranged to control the uniting mechanisms and the disconnecting device.

53. A winder having, in combination, a drum for rotating a warp beam, means including a drive belt to drive the drum, mechanisms for uniting a reserve thread to an exhausted thread, a belt-shifter tending to shift the belt to disconnect the driving means from the drum, and a single set of detectors arranged to control the uniting mechanisms and the belt-shifter.

54. A winder having, in combination, a detector, means tending to stop the machine, a lock for said stopping means, and means to operate the lock to release the stopping means, said lock-operating means including a member which is set in action by the detector, and a cooperating yieldable member arranged to be held against yielding by the detector.

55. In a machine for tying twine, a winding means adapted to operate during the tying operation, means for tying a new end to the twine being wound, means for operating said machine, and a clutch mechanism adapted to automatically discontinue the operation of the twine tying mechanism after said twine has been knotted.

56. In a machine for tying twine, a winding means adapted to operate during the tying operation, a relatively stationary knotter for tying a new end to the twine being wound, mechanism adapted to drive said machine, a shaft, and means on said shaft for discontinuing the operation of said tying means after one revolution thereof.

57. A winder having, in combination, a row of detectors each arranged to be supported upon a thread, a thread-uniter, and means including a member movable along the row of detectors for carrying an exhausted thread to the thread-uniter, said detectors tending to draw their respective threads into the path of movement of said member.

58. A winder having, in combination, detectors to detect exhaustion of the threads being wound, a stationary normally-idle knotter having a tying bill and thread-guides at each side of the bill, a thread-carrier movable step by step, the movement of the carrier being controlled by the detectors, and a series of supports on said carrier to support a series of threads, a portion of each thread extending transversely of the direction of movement of the carrier, and the tying bill and guides being located in the path of movement of such transverse thread-portions.

59. A winder having, in combination, means for continuously rotating a winding carrier, a knotter for tying a new thread to the thread being wound, a shaft for driving the knotter, means to rotate the shaft, and means on said shaft for discontinuing the rotation thereof upon the completion of one cycle of operations of the knotter.

60. A winder having, in combination, means for continuously rotating a winding carrier, a relatively stationary knotter for tying a new thread to the thread being wound, and a clutch mechanism arranged automatically to discontinue the operation of the knotter upon the completion of one cycle of operations of the knotter.

61. A winder having, in combination, a thread carrier, means for moving the carrier, and means on the carrier for supporting thread portions extending transversely of the direction of movement of the carrier, each of said supporting means comprising two members notched to receive a thread, a clamp to hold the end of said thread, a yielding clamp to hold the thread at a point between the first mentioned clamp and one of the notched members, and means to open the first mentioned clamp.

62. A winder having, in combination, means for holding an active and a reserve thread supply; means for continuously rotating a winding carrier upon which the active thread is wound; a stationary knotter adapted to tie the active and reserve threads together; and means for forming a loop in said active thread between the knotter and the winding carrier.

63. A winder having, in combination, means for holding an active and a reserve thread supply; means for continuously rotating a winding carrier upon which the active thread is wound; a stationary thread-uniter adapted to unite said threads; and means for forming a loop in said active thread between the thread-uniter and the winding carrier.

64. A winder having, in combination, a movable creel for supporting thread carriers before, during and after unwinding; a continuously operating winding means to which the thread of one of said carriers extends; a detector through which said thread extends; a series of devices moving with the creel for holding the ends of the threads on the other thread carriers; a stationary knotter, and means for moving the creel and said series of holding devices to carry the threads held by the latter successively directly into operative relation to the knotter.

65. A winder having, in combination, continuously operating winding means, a movable creel adapted to carry a plurality of bobbins for supplying the winding means, and mechanisms operated automatically, when the supply from one of said bobbins to the winding means ceases, to move the creel to bring another bobbin to operative position and attach the leading end of the thread on the latter bobbin to the following end of the thread passing to the winding means, said mechanisms including a detector for the last mentioned thread, and a knotter to operate on said thread-ends at a point between the detector and said latter bobbin.

66. A winder having, in combination, means continuously to rotate a receiving thread carrier; supports for a plurality of supply bobbins, the thread from one of said bobbins extending to said carrier; a detector for said thread; a stationary knotter; means to carry an exhausted thread from its detector to the knotter; and means to carry threads from the other bobbins to the knotter, the latter being positioned to operate upon the threads at a point between the detector and the supply bobbin.

67. A winder having, in combination, means continuously to rotate a receiving thread carrier; a support for a supply bobbin, the thread of which runs to said carrier; a support for a reserve bobbin; a stationary knotter for uniting the thread of the reserve bobbin to the running thread upon exhaustion of the latter; and means to form a loop in the running thread to serve as a supply for the winding means while the knotter is acting.

68. A winder having, in combination, means continuously to rotate a receiving thread carrier; supports for a plurality of supply bobbins, the thread from one of said bobbins extending to said carrier; a detector for said thread; a stationary knotter, means to carry said thread, when exhausted, from the detector to the knotter; and a series of clamps to hold the threads of the other bobbins, said clamps being movable to carry successive threads directly into the knotter, the latter being positioned to operate upon the threads at a point between the detector and the supply bobbin.

69. A machine for winding a mulitple-thread mass having, in combination, means continuously to rotate a receiving thread carrier to which a plurality of threads extend; a detector for each of said threads, means to support a plurality of reserve threads and a stationary knotter for uniting a reserve thread to any one of the first-mentioned threads upon exhaustion, the operation of said knotter being controlled by said detectors.

70. A winder having, in combination, means continuously to rotate a receiving yarn mass to which a plurality of threads extend, a single stationary knotter, detectors engaging said threads at a point between the knotter and the receiving yarn mass, a falling detector acting to form a loop in an exhausted thread to furnish thread to the receiving yarn mass, and means to place any exhausted thread in the knotter.

71. A winder having, in combination, means continuously to rotate a receiving yarn mass to which a plurality of threads extend, a knotter, detectors engaging said threads at a point between the knotter and the receiving yarn mass, a falling detector acting to form a loop in an exhausted thread to furnish thread to the receiving yarn mass, and means to place the exhausted thread in the knotter.

72. A winder having, in combination, means continuously to rotate a receiving yarn mass to which a plurality of threads extend, a knotter, means engaging said threads at a point between the knotter and the receiving yarn mass to form a loop in an exhausted thread to furnish thread to the receiving yarn mass, and means to place the exhausted thread in the knotter.

In testimony whereof I hereunto set my hand.

HOWARD D. COLMAN.